(12) United States Patent
Matsumura et al.

(10) Patent No.: US 11,502,432 B2
(45) Date of Patent: Nov. 15, 2022

(54) WIRING MODULE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP); TOYOTA JIDOSHA KABUSHIKI KAISHA, Aichi-ken (JP)

(72) Inventors: Nobuyuki Matsumura, Mie (JP); Shinichi Takase, Mie (JP); Yusuke Suzuki, Aichi-ken (JP); Atsushi Yamanaka, Aichi-ken (JP); Takeo Kakishima, Aichi-ken (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP); TOYOTA JIDOSHA KABUSHIKI KAISHA, Aichi (JP)

( * ) Notice: Subject to any disclaimer, the term of this patent is extended or adjusted under 35 U.S.C. 154(b) by 571 days.

(21) Appl. No.: 16/492,356

(22) PCT Filed: Feb. 9, 2018

(86) PCT No.: PCT/JP2018/004570
§ 371 (c)(1),
(2) Date: Sep. 9, 2019

(87) PCT Pub. No.: WO2018/168280
PCT Pub. Date: Sep. 20, 2018

(65) Prior Publication Data
US 2020/0395693 A1 Dec. 17, 2020

(30) Foreign Application Priority Data
Mar. 14, 2017 (JP) .............................. JP2017-048354

(51) Int. Cl.
*H01R 11/28* (2006.01)
*H01H 85/02* (2006.01)
(Continued)

(52) U.S. Cl.
CPC ....... *H01R 11/287* (2013.01); *H01H 85/0241* (2013.01); *H01H 85/2045* (2013.01);
(Continued)

(58) Field of Classification Search
CPC . H01R 11/287; H01M 50/502; H01M 50/543; H01M 50/581; H01M 10/482;
(Continued)

(56) References Cited

U.S. PATENT DOCUMENTS 5,328,392 A * 7/1994 Lin ...................... H01R 13/113
439/833
5,438,310 A * 8/1995 Ikari ...................... H01H 85/20
337/191
(Continued)

FOREIGN PATENT DOCUMENTS

| JP | 2000-223098 | 8/2000 |
|---|---|---|
| JP | 2013-106400 | 5/2013 |

(Continued)

OTHER PUBLICATIONS

International Search Report issued in International Bureau of WIPO Patent Application No. PCT/JP2018/004570, dated Mar. 20, 2018 (with English translation).

*Primary Examiner* — Anatoly Vortman
(74) *Attorney, Agent, or Firm* — Greenblum & Bernstein, P.L.C.

(57) ABSTRACT

A wiring module to be attached to a plurality of power elements which store or generate power includes a bus bar connecting the power elements to each other or connecting the power element and a load to each other, an abnormality
(Continued)

detection element detecting an abnormality of the power element, and an insulating protector holding the bus bar and the abnormality detection element. The insulating protector is integrally provided with a first holding shaft portion and a second holding shaft portion which position and hold the bus bar by fitting the bus bar there onto, and an element holding portion which position and hold the abnormality detection element by fitting the abnormality detection element there into.

7 Claims, 24 Drawing Sheets

(51) Int. Cl.
    *H01H 85/20*        (2006.01)
    *H01M 10/48*       (2006.01)
    *H01M 50/502*     (2021.01)
    *H01M 50/543*     (2021.01)

(52) U.S. Cl.
    CPC ....... *H01M 10/482* (2013.01); *H01M 50/502* (2021.01); *H01M 50/543* (2021.01); *H01H 85/205* (2013.01); *H01M 2200/103* (2013.01)

(58) Field of Classification Search
    CPC ........ H01M 2200/103; H01H 85/0241; H01H 85/2045; H01H 85/205
    USPC .................................... 439/620.28
    See application file for complete search history.

(56) References Cited

U.S. PATENT DOCUMENTS

| | | | | |
|---|---|---|---|---|
| 5,551,894 A * | 9/1996 | Lin | .......... | H01R 9/245 439/830 |
| 5,643,693 A * | 7/1997 | Hill | .......... | H01M 50/50 429/123 |
| 6,146,788 A * | 11/2000 | Ikeda | .......... | H01M 50/502 429/7 |
| 6,152,776 A * | 11/2000 | Ikeda | .......... | H01M 50/569 439/627 |
| 6,233,160 B1 * | 5/2001 | Shockley | .......... | H02B 1/28 361/833 |
| 6,290,552 B1 * | 9/2001 | Saito | .......... | H01M 50/502 439/736 |
| 6,294,978 B1 * | 9/2001 | Endo | .......... | H01H 85/044 337/159 |
| 6,456,188 B1 * | 9/2002 | Tsuchiya | .......... | H01H 85/205 337/191 |
| 6,512,443 B1 * | 1/2003 | Matsumura | .......... | H01H 85/044 337/187 |
| 6,576,838 B2 * | 6/2003 | Matsumura | .......... | H01H 85/044 439/522 |
| 6,753,754 B1 * | 6/2004 | Black | .......... | H01R 9/245 337/214 |
| 6,902,434 B2 * | 6/2005 | Stack | .......... | H01M 50/543 439/620.28 |
| 7,077,704 B2 * | 7/2006 | Ikeda | .......... | H01M 50/502 439/627 |
| 7,420,453 B2 * | 9/2008 | Matsumura | .......... | H01H 85/044 337/159 |
| 7,592,892 B2 * | 9/2009 | Ito | .......... | H01H 85/045 337/186 |
| 7,663,466 B1 * | 2/2010 | Jetton | .......... | H01R 11/287 361/833 |
| 7,990,738 B2 * | 8/2011 | Urrea | .......... | H01H 85/12 361/833 |
| 9,007,164 B2 * | 4/2015 | Iwata | .......... | H01H 69/02 337/296 |
| 9,142,828 B2 * | 9/2015 | Matsumoto | .......... | B60R 16/0238 |
| 9,384,929 B2 * | 7/2016 | Masuda | .......... | H01H 85/0241 |
| 9,388,937 B2 * | 7/2016 | Shimizu | .......... | H01M 50/50 |
| 9,425,018 B2 * | 8/2016 | Nohara | .......... | H01H 85/201 |
| 10,224,532 B2 | 3/2019 | Okamoto | | |
| 10,510,507 B2 * | 12/2019 | Kitano | .......... | H01H 85/20 |
| 2004/0007375 A1 * | 1/2004 | Higuchi | .......... | H01H 85/2045 174/50 |
| 2005/0026471 A1 * | 2/2005 | Kobayashi | .......... | H01R 9/223 439/76.2 |
| 2013/0027174 A1 * | 1/2013 | Masuda | .......... | H01H 85/0241 337/142 |
| 2015/0125727 A1 | 5/2015 | Lui et al. | | |
| 2017/0345601 A1 * | 11/2017 | Kitano | .......... | H01M 50/581 |
| 2018/0212224 A1 | 7/2018 | Nakayama et al. | | |

FOREIGN PATENT DOCUMENTS

| | | | |
|---|---|---|---|
| JP | 2014-022256 | * | 2/2014 |
| JP | 2014-22256 | | 2/2014 |
| JP | 2014-220069 | * | 11/2014 |
| JP | 2015-018631 | * | 1/2015 |
| JP | 2015-18631 | | 1/2015 |
| JP | 2015-207340 | | 11/2015 |
| JP | 2015-207393 | | 11/2015 |
| JP | 2017-27672 | * | 2/2017 |
| WO | 2016/098605 | | 6/2016 |

\* cited by examiner

WIRING MODULE

TECHNICAL FIELD

The present invention relates to a wiring module.

BACKGROUND ART

As a wiring module connected to a power storage module, a wiring module, in which a battery abnormality detection element for detecting an abnormality in a voltage or an abnormality in a temperature of a battery is connected to a conductor connecting batteries to each other or connecting a battery and a load to each other, has been known. In this case, since behaviors when an external force such as vibration or the like is applied are different due to a difference in mass between the abnormality detection element and the conductor, a load is apt to be applied to a part where the abnormality detection element and the conductor are connected to each other.

Therefore, for example, Patent Document 1 describes a configuration in which a conductor is fixed to a case and a fuse is fixed to a cover covering the case to integrally hold the conductor and the fuse.

RELATED ART DOCUMENT

Patent Document

[Patent Document 1] Japanese Unexamined Patent Application Publication No. 2015-207393 (pages 5 and 6, FIG. 2)

SUMMARY OF THE INVENTION

Problem to be Solved by the Invention

However, in this configuration, when fitting the conductor into the case and inserting an electrode to fix the electrode using a nut, since the conductor rotates, a connection terminal for connection to a fuse, which extends from the conductor, is liable to deviate from a regular position in a circumferential direction. In this case, when putting the cover later to mount the fuse, since a terminal of the fuse is fitted in a state of being relatively horizontally misaligned from the connection terminal of the conductor, it is apprehended that a connection failure occurs.

Moreover, even when the terminals of the conductor and the fuse are normally connected to each other, rattling occurs when an external force such as vibration or the like is applied at the time of use, due to a clearance caused by accumulated tolerances of the respective members including the conductor, the case, the fuse, and the cover, such that a load is apt to be applied to a part where the terminals are connected to each other.

The present invention is completed based on the reason described above, and an object of the present invention is to provide a wiring module which can securely fix an abnormality detection element and a terminal and retain a proper connection.

Means for Solving the Problem

A wiring module according to a technology disclosed in the present description is a wiring module to be attached to a plurality of power elements which stores or generates power, the wiring module including: a connection conductor connecting the power elements to each other or connecting the power element and a load to each other; an abnormality detection element detecting an abnormality of the power element; and an insulating protector holding the connection conductor and the abnormality detection element. The insulating protector is integrally provided with a conductor holding portion which positions and holds the connection conductor by fitting the connection conductor thereonto, and an element holding portion which positions and holds the abnormality detection element by fitting the abnormality detection element thereinto.

In a case where the connection conductor and the abnormality detection element are connected, it is highly likely that connected parts of the connection conductor and the abnormality detection element are damaged due to application of a force caused by different behaviors occurring when an external force such as vibration is applied to the connection conductor and the abnormality detection element. However, according to the above configuration, since both of the connection conductor and the abnormality detection element are integrally fixed to the insulating protector, for example, there is no risk that the abnormality detection element shakes alone or only the connection conductor rotates together when the connection conductor is attached to the power element, and it is possible to suppress generation of a force applied to the connected part.

In addition, it is possible to integrally fix the connection conductor and the abnormality detection element only by fitting them onto the insulating protector, and thus, for example, there is no need to perform insert molding or the like, and cost reduction can be achieved.

As an aspect related to the wiring module disclosed in the present description, the following configuration is preferable.

(1) The conductor holding portion may include a tapered portion protruding from the insulating protector and press-fitted into a fitting hole formed in the connection conductor, and the element holding portion may include a pair of element holding claw portions between which the abnormality detection element is press-fitted and held.

(2) The conductor holding portion may include a first conductor holding portion and a second conductor holding portion, and the connection conductor may include a circular first holding hole portion fitted onto the tapered portion of the first conductor holding portion, and a second holding hole portion having an elongated shape in a radial direction around the first holding hole portion and fitted onto the tapered portion of the second conductor holding portion.

Each dimension of the connection conductor and the insulating protector has an error within a tolerance range. When fitting the insulating protector into the connection conductor, the smaller the clearance between the connection conductor and the insulating protector due to accumulated errors in dimension is, the closer the connection conductor and the insulating protector are fitted. In this case, however, since an extremely accurate alignment is required, a fitting operation becomes difficult. Further, the larger the clearance between the connection conductor and the insulating protector due to accumulated errors in dimension is, the easier the fitting operation becomes. In this case, however, fitting between the connection conductor and the insulating protector loosens, such that rattling becomes severe.

Whereas, according to the above configuration, since the first holding hole portion of the connection conductor is closely fitted onto the tapered portion of the first conductor holding portion, it is possible to prevent the rattling by absorbing the accumulated errors in dimension. Further, since the second holding hole portion has an ample dimension in a radial direction around the first holding hole portion, it is easy to position the second holding hole portion with respect to the second conductor holding portion regardless of an amount of accumulated errors in dimension, and since the second holding hole portion is closely fitted on the tapered portion of the second conductor holding portion, it is possible to prevent rattling.

(3) The insulating protector may be provided with a pedestal portion on which the conductor holding portion and the element holding portion are provided, and a cover portion covering the conductor holding portion and the element holding portion, and the cover portion may be provided with a conductor pressing portion holding the connection conductor between the conductor pressing portion and the pedestal portion, and an auxiliary element holding portion holding the abnormality detection element between the auxiliary element holding portion and the pedestal portion.

(4) The auxiliary element holding portion may include a pair of opening preventing portions between which the pair of element holding claw portions is pinched.

According to this configuration, it is possible to closely fit the abnormality detection element onto the insulating protector only by fitting the abnormality detection element between the element holding claw portions. Further, thereafter, the element holding claw portions are pinched by the auxiliary element holding portions, such that it is possible to suppress an elastic deformation force of the claw portions. As a result, it is possible to retain a state where the abnormality detection element is securely fixed to the insulating protector even when an external force such as vibration is applied to the insulating protector.

Advantageous Effects of Invention

According to the present invention, the wiring module which can securely fix the abnormality detection element and the terminal and retain a proper connection can be provided.

MODE FOR CARRYING OUT THE INVENTION

Embodiment

Embodiment 1 of the present invention will be described with reference to FIGS. 1 to 23. Note that in the following description, a Y direction, an X direction, and a Z direction in FIG. 1 point to the front, the left, and the top, respectively.

Figure 1:
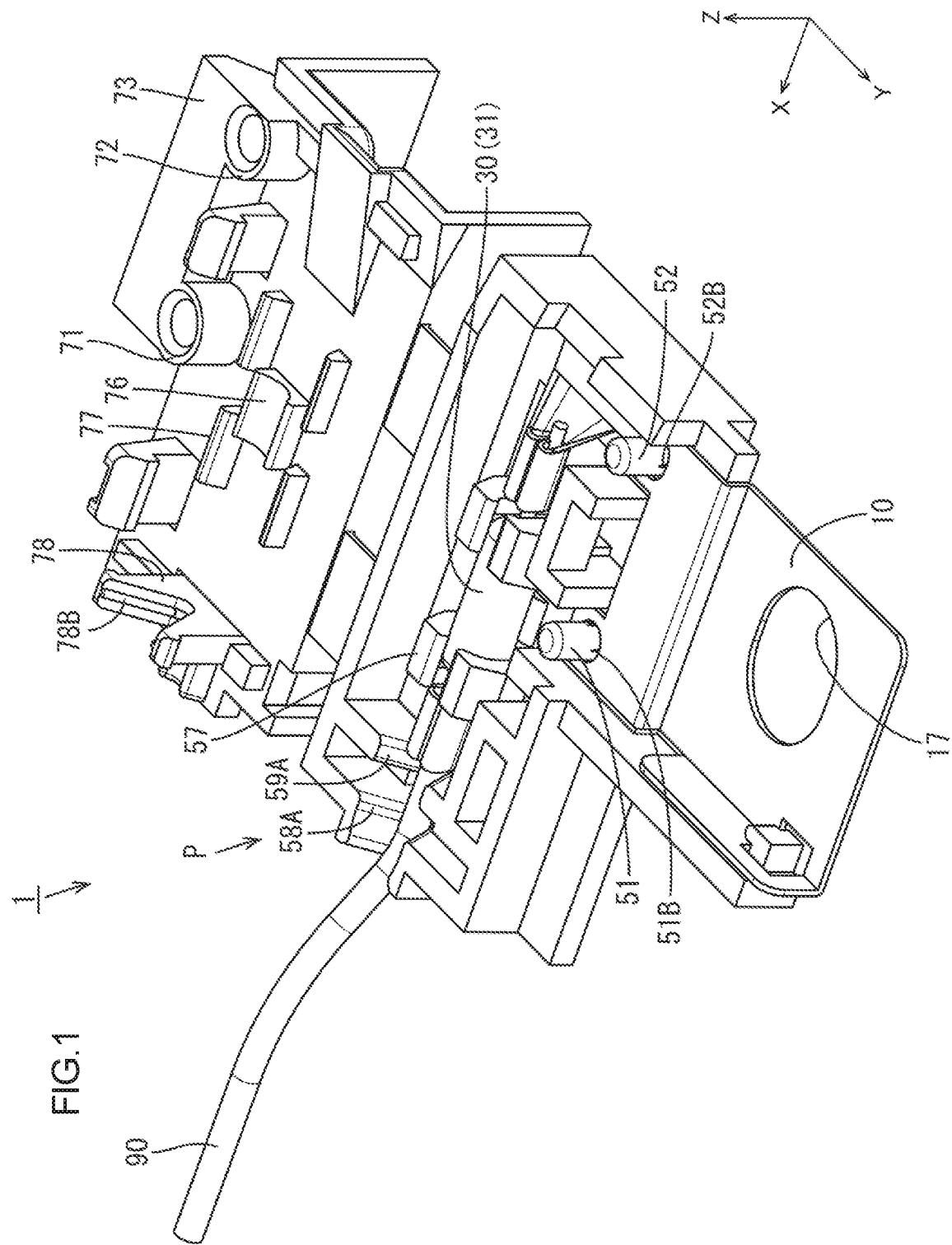
FIG. 1 is a perspective view of a wiring module according to an embodiment.

A wiring module 1 of the present embodiment is disposed on a power module used as a power supply in a vehicle such as an electric car or a hybrid car, and includes, as illustrated in FIG. 1, a bus bar 10 (an example of a connection conductor) connected to an electrode 3 of one of a plurality of power elements 2 constituting the power module, a fuse 30 (an example of an abnormality detection element) having one end portion connected to the bus bar 10, a detection wire 90 electrically connected to the other end portion of the fuse 30, and an insulating protector P integrally holding the bus bar 10, the fuse 30, and the detection wire 90.

The other end portion of the detection wire 90 is electrically connected to an electronic control unit (ECU) (not illustrated) which monitors a state of the power element 2 by detecting a voltage or the like, and the fuse 30 cuts-off a detection voltage when an abnormality occurs in a voltage of the power element 2. The fuse 30 is an example of the abnormality detection element. The abnormality detection element is net limited thereto and may be, for example, a thermistor which detects an abnormally high temperature.

Figure 2:
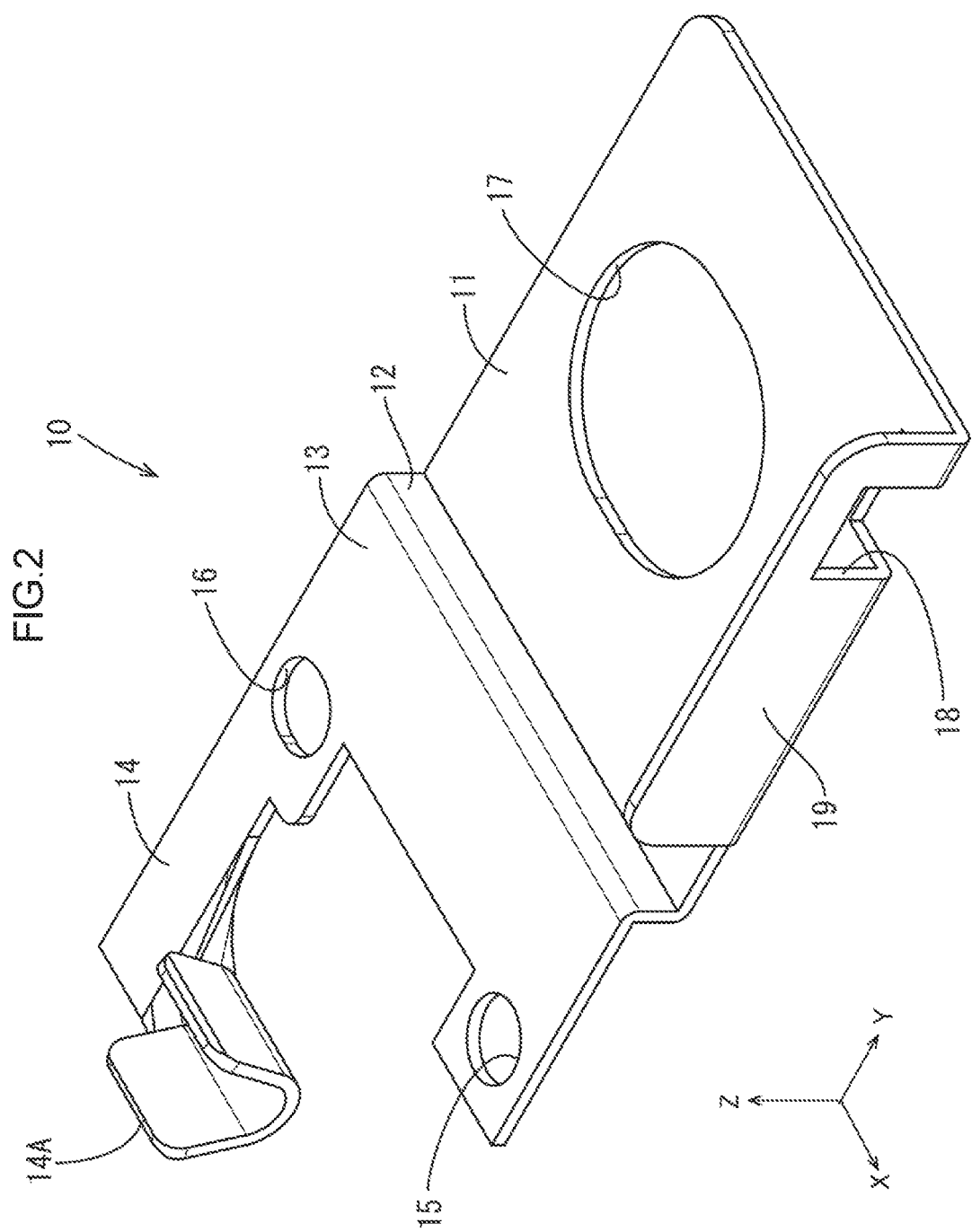
FIG. 2 is a perspective view of a bus bar.
Figure 3:
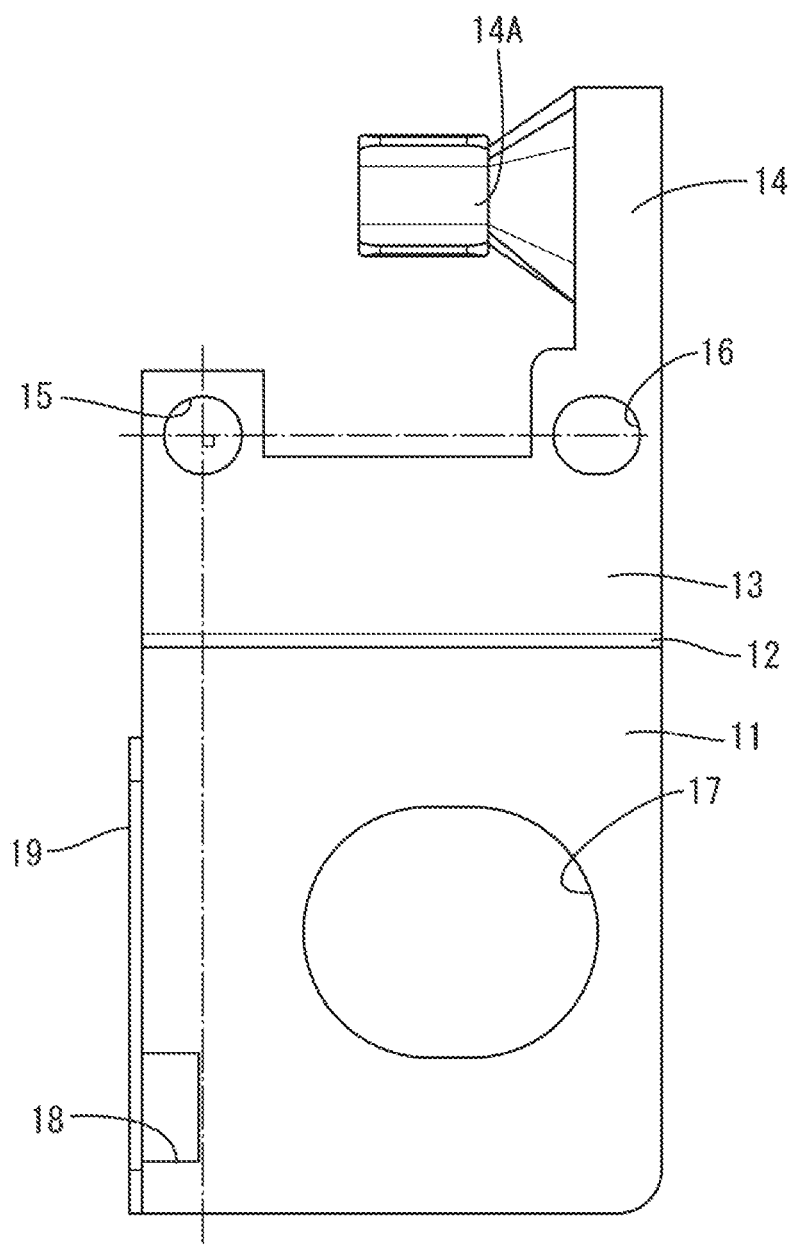
FIG. 3 is a top view of the bus bar.

As illustrated in FIGS. 2 and 3, the bus bar 10 is entirely formed of one metal plate, and includes a substantially rectangular lower step portion 11, an upper step portion 13 extending from a rear edge of the lower step portion 11 while passing through a step portion 12, and a connection portion 14 extending from a right end of a rear edge portion of the upper step portion 13.

A first holding hole portion 15 (an example of a fitting hole) having a substantially circular shape and penetrating through a plate surface is provided in the vicinity of a left end of a rear side of the upper step portion 13, and a second holding hole portion 16 (an example of the fitting hole) having a substantially elliptical shape which is elongated laterally (that is, in a radial direction around the first holding hole portion 15) and penetrating through the plate surface is provided in the vicinity of a right end of the rear side of the upper step portion 13. The first holding hole portion 15 and the second holding hole portion 16 are laterally aligned with a notch portion interposed therebetween. Specifically, the first holding hole portion 15 and the second holding hole portion 16 are disposed such that an extension line of a major axis of the second holding hole portion 16 passes through a central point of the first holding hole portion 15.

An electrode insertion hole 17 having a substantially laterally elliptical shape and penetrating through the plate surface is provided at substantially the center of the lower step portion 11.

Further, a mooring hole portion 18 having a substantially elliptical shape and penetrating through the plate surface is provided in the vicinity of a left end of a front side of the lower step portion 11, and a portion near a left edge of the lower step portion 11 is bent upwardly at a substantially right angle along a line passing through the center of the mooring hole portion 18 in a right-left direction of the mooring hole portion 18 in a band shape to form an abutting wall portion 19. That is, the mooring hole portion 18 has a cross-section in the right-left direction with an L-letter shape.

Further, as illustrated in FIG. 3, the mooring hole portion 18 is disposed such that an extension line of a right edge portion of the mooring hole portion 18 in the lower step portion 11 passes through the central point of the first holding hole portion 15. In this case, the extension line of the major axis of the second holding hole portion 16 and the extension line of the right edge portion of the mooring hole portion 18 form a right angle with the central point of the first holding hole portion 15 as an apex.

The connection portion 14 has a rear end extending obliquely left-upward and a barrel portion 14A having a substantial V-letter shape when viewed from the side is provided at a distal end of the extended portion of the connection portion 14.

Figure 4:
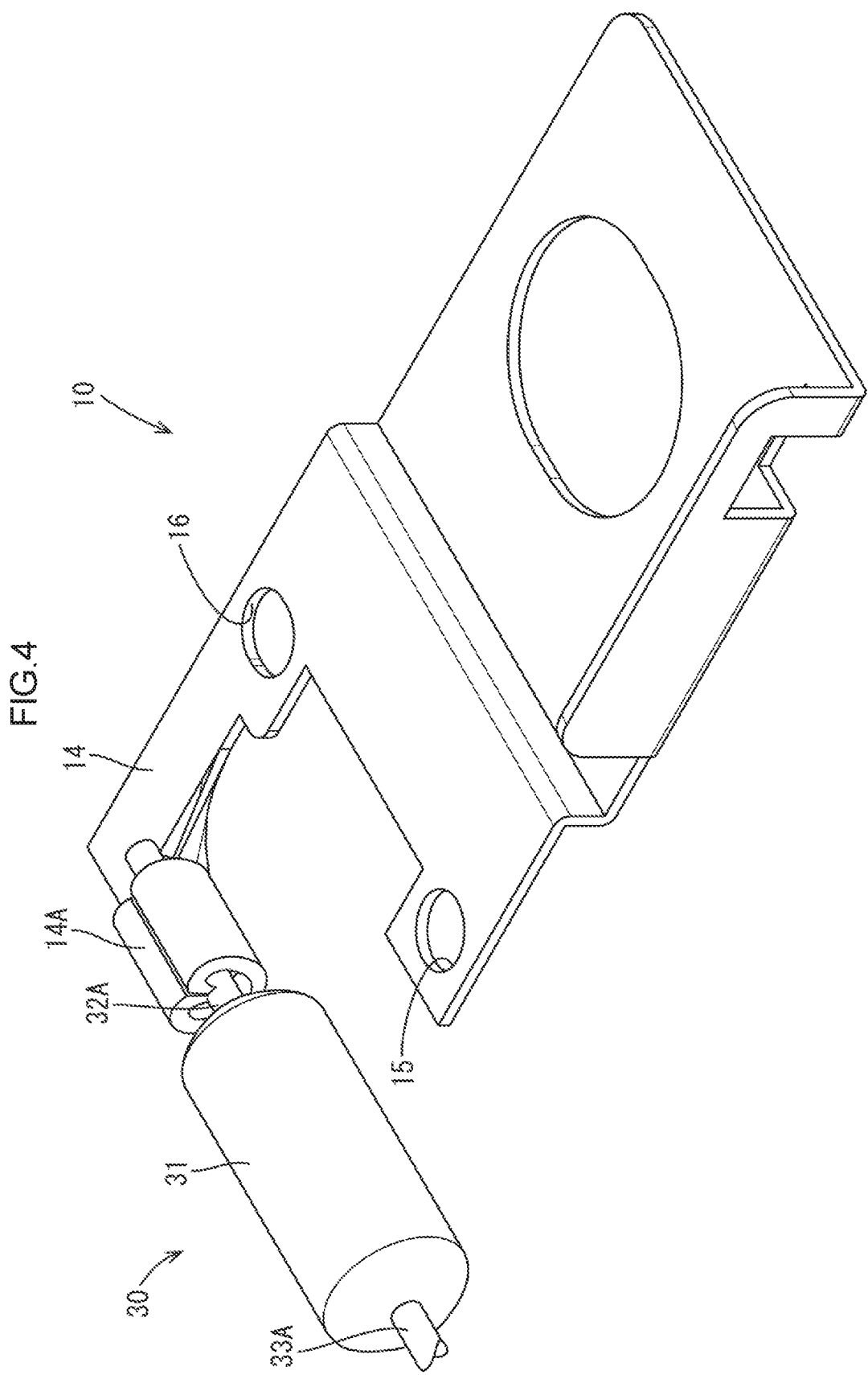
FIG. 4 is a perspective view illustrating a state in which a fuse is connected to the bus bar.

As illustrated in FIG. 4, the fuse 30 includes a fuse main body portion 31 having a substantially cylindrical shape, a first terminal portion 32A extending from a central portion of a right end surface of the fuse main body portion 31, and a second terminal portion 33A extending from a central portion of a left end surface of the fuse main body portion 31. The barrel portion 14A of the bus bar 10 is caulked and crimped to the first terminal portion 32A, and the second terminal portion 33A is caulked and crimped to the detection wire 90 by using a known sleeve or the like. By doing so, the bus bar 10 and the detection wire 90 are electrically connected to each other through the fuse 30.

The insulating protector P is formed of an insulating synthetic resin and integrally includes a pedestal portion 50 having a substantially rectangular parallelepiped plate shape, a cover portion 70 connected to a rear wall portion 61 provided at a rear end of the pedestal portion 50 through a hinge as illustrated in FIGS. 5 to 8.

A first holding shaft portion 51 (an example of a conductor holding portion) and a second holding shaft portion 52 (an example of a conductor holding portion) for fixing the bus bar 10, and an element holding portion 55 for holding the fuse 30 are provided on an upper portion of the pedestal portion 50.

The first holding shaft portion 51 (an example of the first conductor holding portion) and the second holding shaft portion 52 (an example of the second conductor holding portion) are laterally aligned in a region corresponding to a substantially right-half of a front side of the pedestal portion 50. The holding shaft portions 51 and 52 each have a substantially cylindrical shape, and integrally protrude from a plate surface of the pedestal portion 50. A plurality (in the present embodiment, four for each holding shaft portion) of tapered portions 51B and 52B which are expanded toward the pedestal portion 50 are integrally provided on base ends of the holding shaft portions 51 and 52. The four tapered portions 51B and the four tapered portions 52B are radially arranged at intervals of 90 degrees in a circumferential direction around shaft centers of the cylindrical holding shaft portions 51 and 52, respectively, and have lower ends connected to the plate surface of the pedestal portion 50.

Figure 6:
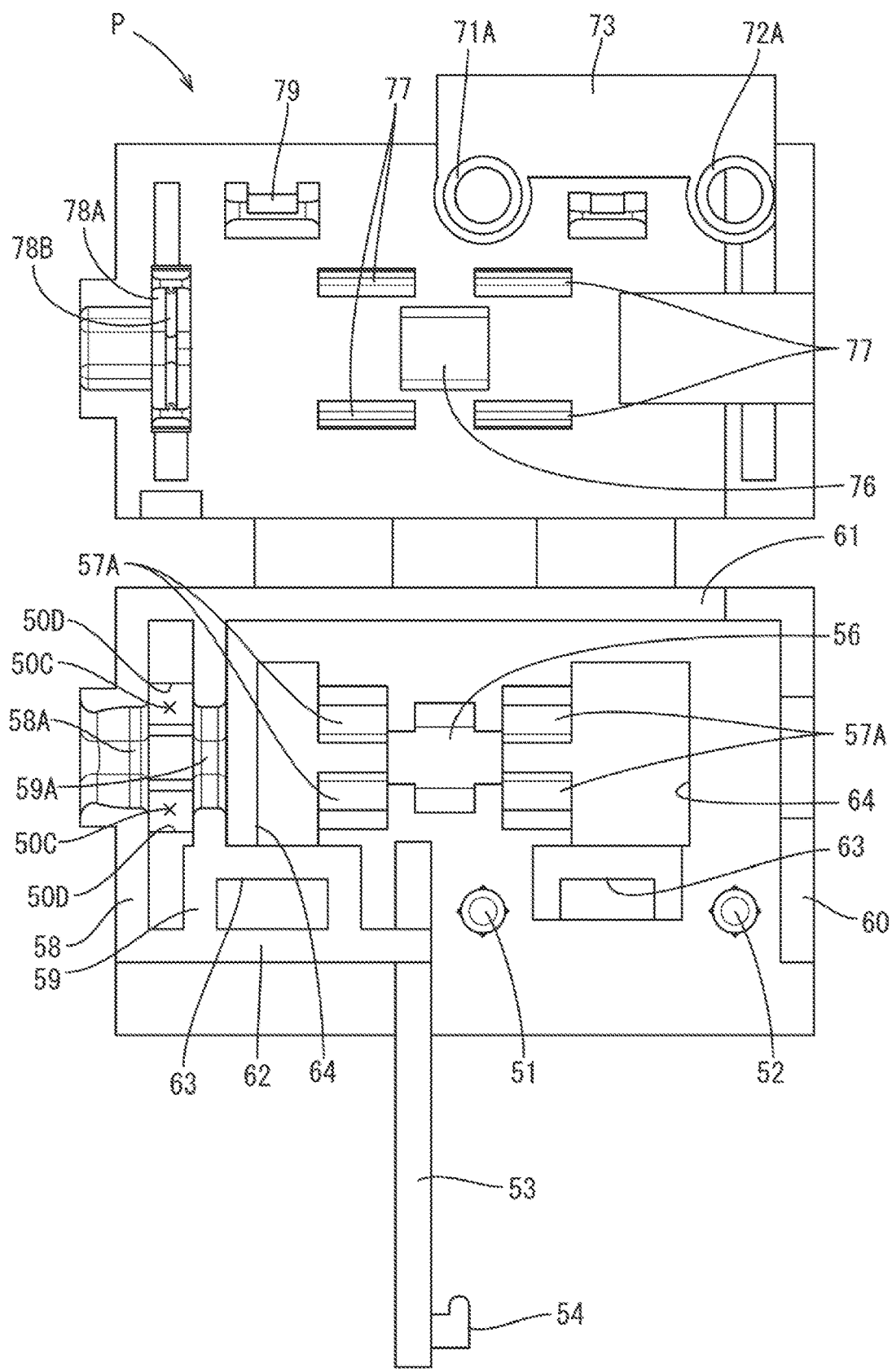
FIG. 6 is a top view of the insulating protector.
Figure 7:
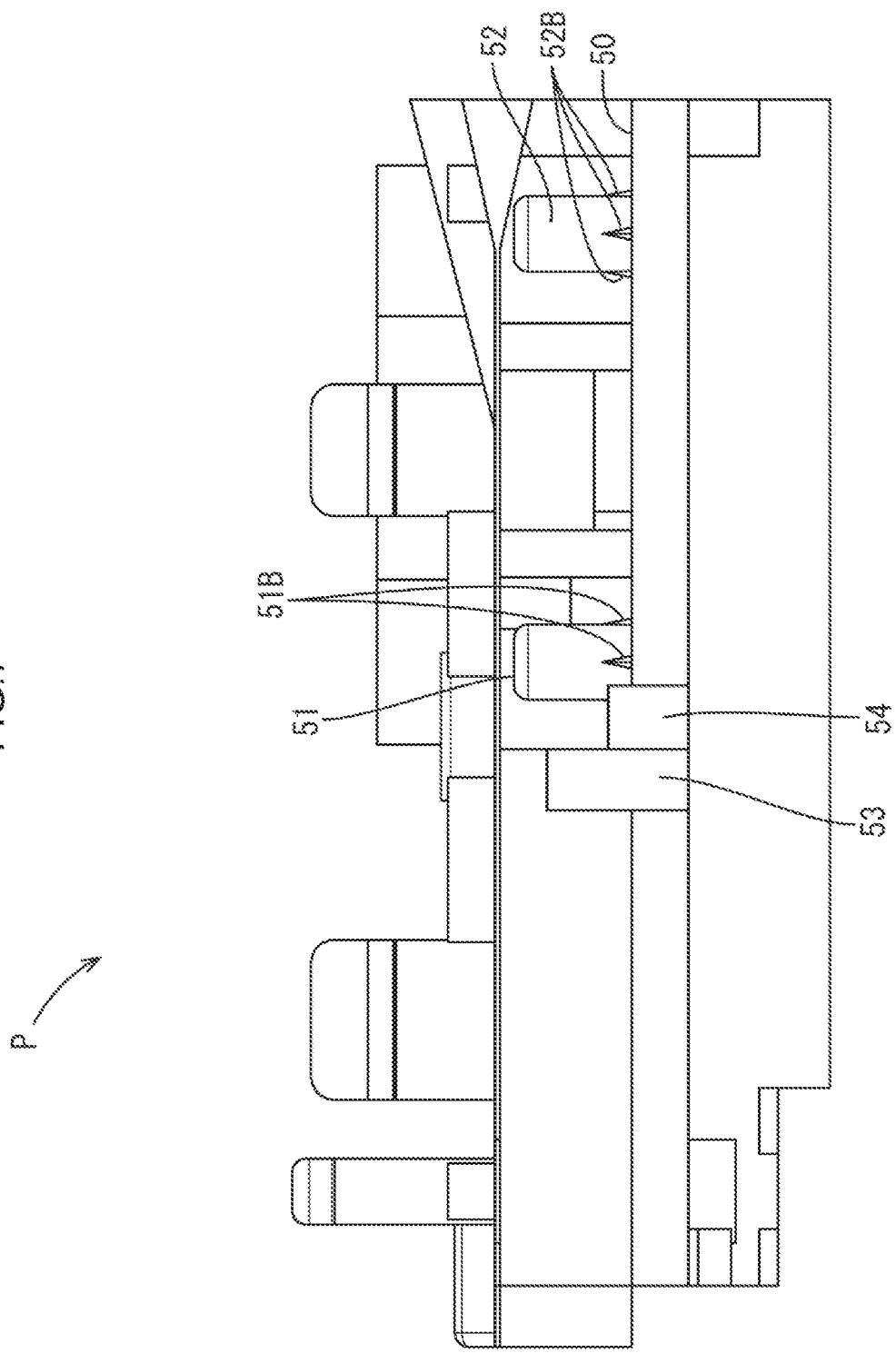
FIG. 7 is a partially enlarged front view of the insulating protector.
Figure 8:
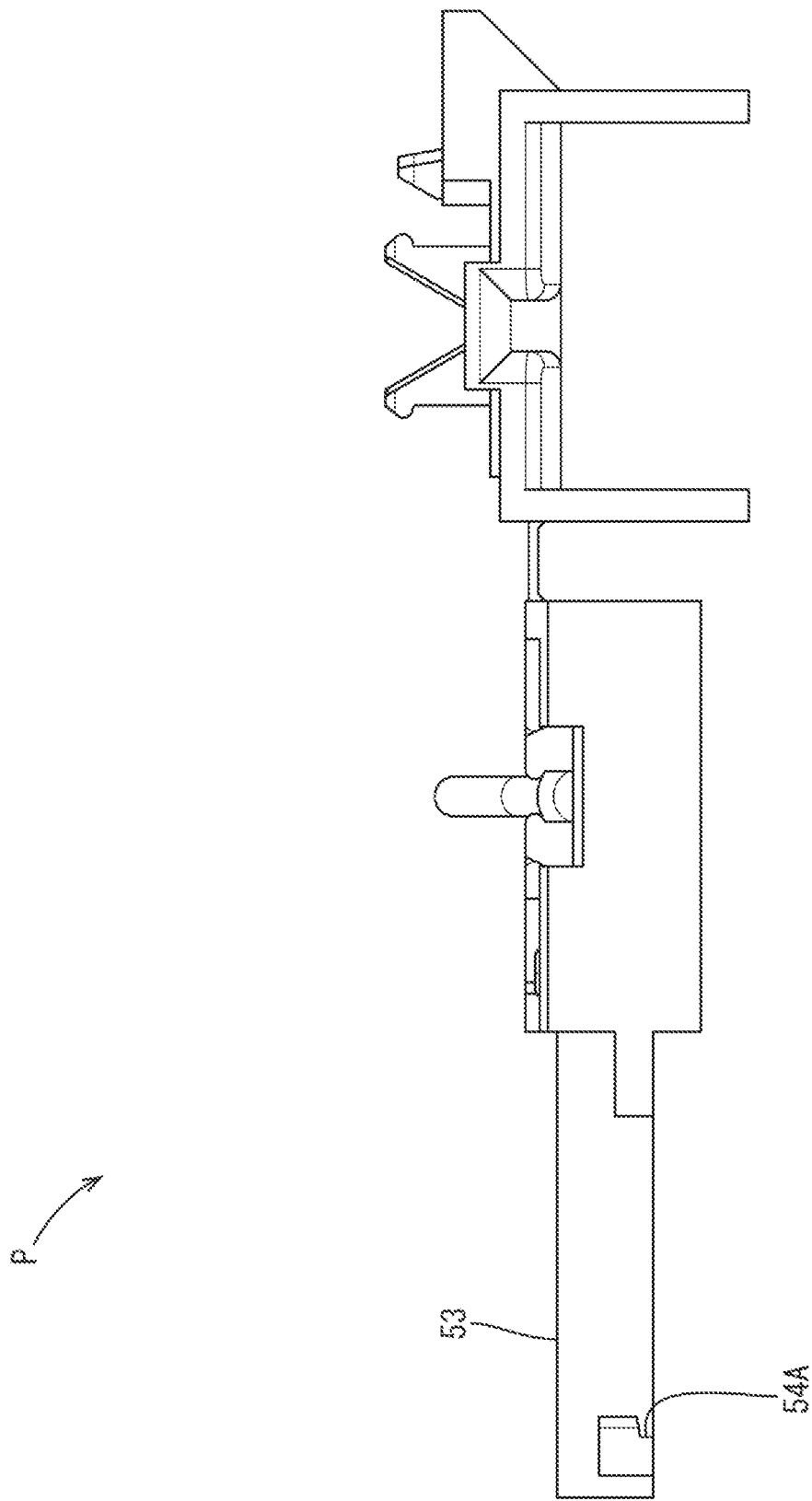
FIG. 8 is a right side view illustrating a state before closing a cover of the wiring module.

An extension wall portion 53 having a prism shape and extending forward from a substantially central portion in the right-left direction is provided at the front side of the pedestal portion 50. A mooring claw portion 54 to be moored to the mooring hole portion 18 of the bus bar 10 extends from a right side surface of a distal end portion of the extension wall portion 53. As illustrated in FIG. 6, the mooring claw portion 54 extends from the distal end portion of the extension wall portion 53 to the right and a distal end of the mooring claw portion 54 extends rearward, such that the mooring claw portion 54 is formed in a hook shape as a whole. A positioning step portion 54A is provided at a lower end portion of a portion extending rearward from the mooring claw portion 54 as illustrated in FIG. 8.

The element holding portion 55 includes a fuse placing portion 56 for placing the fuse 30, and fuse clipping portions 57 (an example of an element holding claw portion) for fixing the fuse 30.

The fuse placing portion 56 is formed in a substantially central portion of the pedestal portion 50 in the left-right direction and is formed as a concave surface having a cross section with an arc shape when viewed from the side. Front and rear edge portions of the fuse placing portion 56 rise while having a cross section with an arc shape when viewed from the side.

The fuse clipping portions 57 protrude from the pedestal portion 50 while being arranged at intervals in a front-rear direction and the right-left direction such that a plurality (in the present embodiment, four) of clipping claw portions 57A surround the fuse placing portion 56. The clipping claw portions 57A disposed at the front side and the clipping claw portions 57A disposed at the rear side among the clipping claw portions 57A are formed in pair, respectively, and are curved such that upper ends face each other, and as a result, an inner surface of the clipping claw portion 57A becomes a concave surface with an arc shape. Two clipping claw portions 57A disposed at a left side of the fuse placing portion 56 are provided with protruding portions 57B having a plate shape at left side portions of the clipping claw portions 57A, respectively, and two clipping claw portions 57A disposed at a right side of the fuse placing portion 56 are provided with protruding portions 57B having a plate shape at right side portions of the clipping claw portions 57A, respectively.

A left wall portion 58 and a middle wall portion 59 are formed at a left end portion of the pedestal portion 50 so as to rise from the pedestal portion 50 while having plate surfaces facing each other in parallel. A first conduction groove 58A and a second conduction groove 59A forming a V-letter shape when viewed from the side are provided at substantially central portions of the left wall portion 58 and the middle wall portion 55 in the front-rear direction, respectively. A width and a depth of the conduction groove 58A and a width and a depth of the conduction groove 59A are substantially the same as each other, respectively. A bottom portion of each of the conduction grooves 58A and 59A has a U-letter shape when viewed from the side, and protrudes to have a cross section with a semi-circular shape along a central line in a thickness direction (right-left direction). Further, in a region of the pedestal portion 50, which is sandwiched between the left wall portion 58 and the middle wall portion 59, wire locking holes 50C for fitting and locking wire locking portions 78C of a fitting wall portion 78 to be described later, which penetrate through the plate surface, are provided, and outer edge portions of the wire locking holes 50C in the front-rear direction become wire locking receiving portions 50D.

A right wall portion 60 is formed so as to rise from the pedestal portion 50 at a right end portion of the pedestal portion 50. Further, a front wall portion 62 is provided so as to rise at a portion slightly behind a front edge portion of the pedestal portion 50, and connects a front end portion of the left wall portion 58, a front end portion of the middle wall portion 59, and a left wall surface of the extension wall portion 53 to one another. The pedestal portion 50 is further provided with locking receiving portions 63 for fitting locking portions 79 provided on a cover portion 70 to be described later, which ere laterally aligned at two places in a region adjacent to the front side of the pedestal portion 50. Further, connection checking openings 64 penetrating through the plate surface are provided in regions at the left and right sides of a region of which four corners are defined by the fuse clipping portions 57 on the pedestal portion 50.

Figure 5:
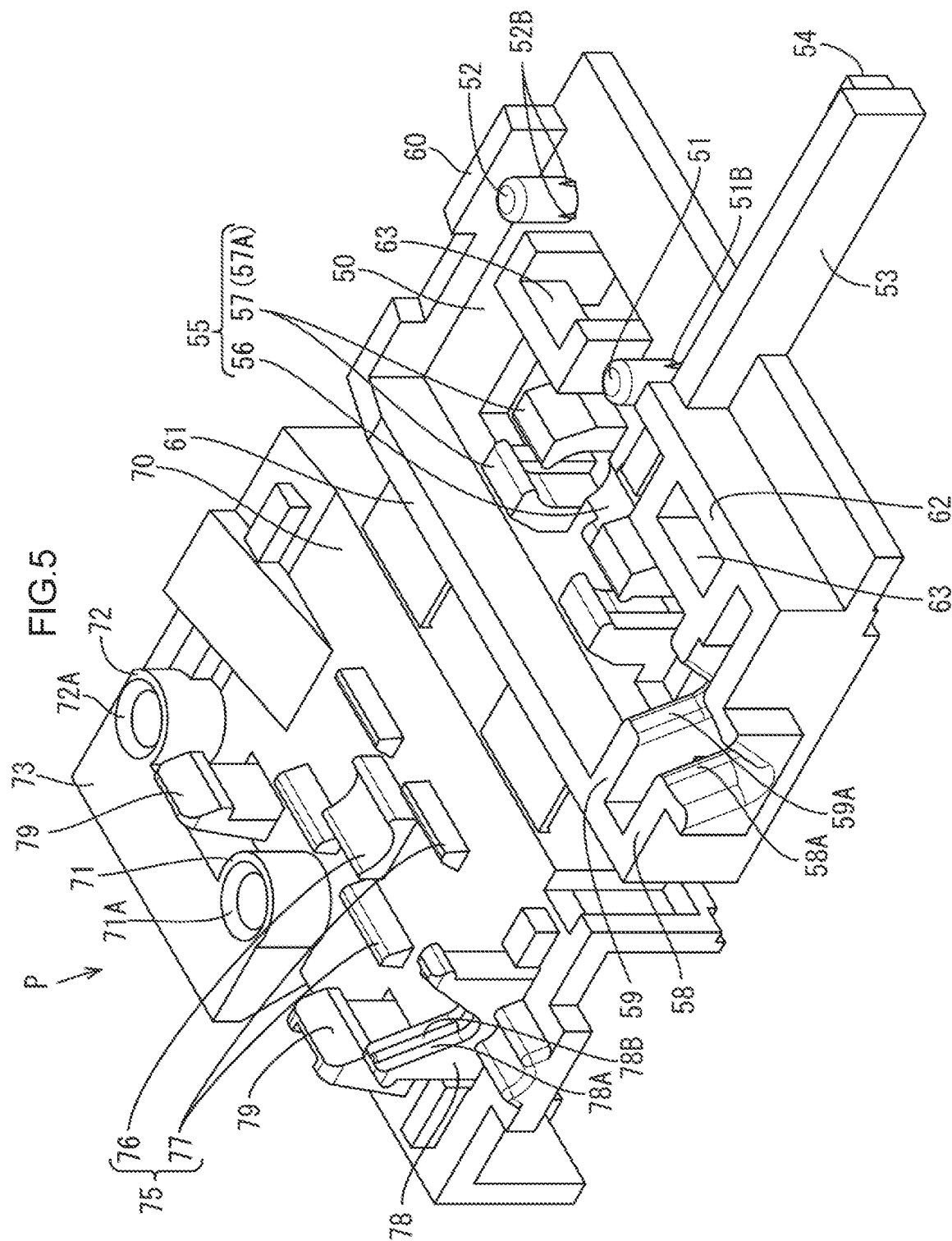
FIG. 5 is a perspective view of an insulating protector.

The cover portion 70 includes bus bar pressing portions 71 and 72 (an example of a conductor pressing portion) and an auxiliary fuse holding portion 75 (an example of an auxiliary element holding portion) on an upper surface in FIG. 5.

The bus bar pressing portions 71 and 72 are constituted by a first bus bar pressing portion 71 and a second bus bar pressing portion 72, and are provided while being laterally aligned adjacent to a rear end portion of the cover portion 70 in a region corresponding to a substantially right half of the cover portion 70. The first bus bar pressing portion 71 and the second bus bar pressing portion 72 each have a cylindrical shape integrally protruding from a plate surface of the cover portion 70, and distal end portions of the first bus bar pressing portion 71 and the second bus bar pressing portion 72 become tapered circumferential surface portions 71A and 72A, each of which an inner diameter is increased toward an upper side. Further, a bus bar pressing surface 73 which is one step higher than an upper surface of the cover portion 70 is provided in an area behind both of the bus bar pressing portions 71 and 72. A dimension of a step between the upper surface of the cover portion 70 and the bus bar pressing surface 73 is substantially the same as a height of each of the bus bar pressing portions 71 and 72. That is, upper edge portions of both of the bus bar pressing portions 71 and 72 are on the same level as that of the bus bar pressing surface 73.

The auxiliary fuse holding portion 75 includes a fuse pressing portion 76 abutting the fuse 30 from above, and opening preventing portions 77 (an example of the element holding claw portion) for the fuse clipping portions 57 provided on the pedestal portion 50.

The fuse pressing portion 76 protrudes from a substantially central portion of the upper surface of the cover portion 70, and is provided with a concave surface having a cross section with an arc shape when viewed from the side.

The opening preventing portions 77 is formed in a form in which four opening preventing pieces protrude from the cover portion 70 while being arranged at intervals in the front-rear direction and the right-left direction so as to surround the fuse pressing portion 76 at the center. An inner surface of each opening preventing piece in the front-rear direction is a tapered surface which is tapered toward an upper side of the opening preventing piece when viewed from the side.

In a region slightly right from a left end portion of the cover portion 70, the fitting wall portion 78 is formed so as to rise from the cover portion 70 in parallel to the left end portion of the cover portion 70. A top-face conduction groove 78A having a V-letter shape when viewed from the side is provided at a substantially central portion of the fitting wall portion 78 in the front-rear direction. A bottom portion of the top-face conduction groove 78A has a U-letter shape when viewed from the side. The top-face conduction groove 78A is provided with a wire pressing portion 78B having a cross section with a semi-circular shape along a central line in a thickness direction (right-left direction) and protruding from the top-face conduction groove 78A. Further, the wire locking portions 78C to be fitted into and locked to the wire locking receiving portions 50D are provided while protruding forward and backward from both front and rear upper end portions of the top-face conduction groove 78A.

Two locking portions 79 fitted into the locking receiving portions 63 of the pedestal portion 50 are provided while being laterally aligned in a region adjacent to the rear end portion of the cover portion 70.

Next, an order in which the bus bar 10, the fuse 30, and the detection wire 90 connected to one another by caulking and crimping are assembled to the insulating protector P will be described.

First, the mooring claw portion 54 provided on the extension wall portion 53 of the insulating protector P is inserted into the mooring hole portion 18 provided in the lower step portion 11 of the bus bar 10, and then the bus bar 10 is moved forward relative to the insulating protector P, such that a rear end surface of the positioning step portion 54A of the mooring claw portion 54 abuts a rear edge portion of the mooring hole portion 18. In this state, the first holding shaft portion 51 of the insulating protector P is put into the first holding hole portion 15 of the bus bar 10, and at the same time, position adjustment is performed such that the second holding shaft portion 52 of the insulating protector P is fitted into the second holding hole portion 16 of the bus bar 10, and then the first holding hole portion 15 and the second holding hole portion 16 are press-fitted onto the tapered portion 51B of the first holding shaft portion 51 and the tapered portion 52B of the second holding shaft portion 52, respectively.

Figure 9:
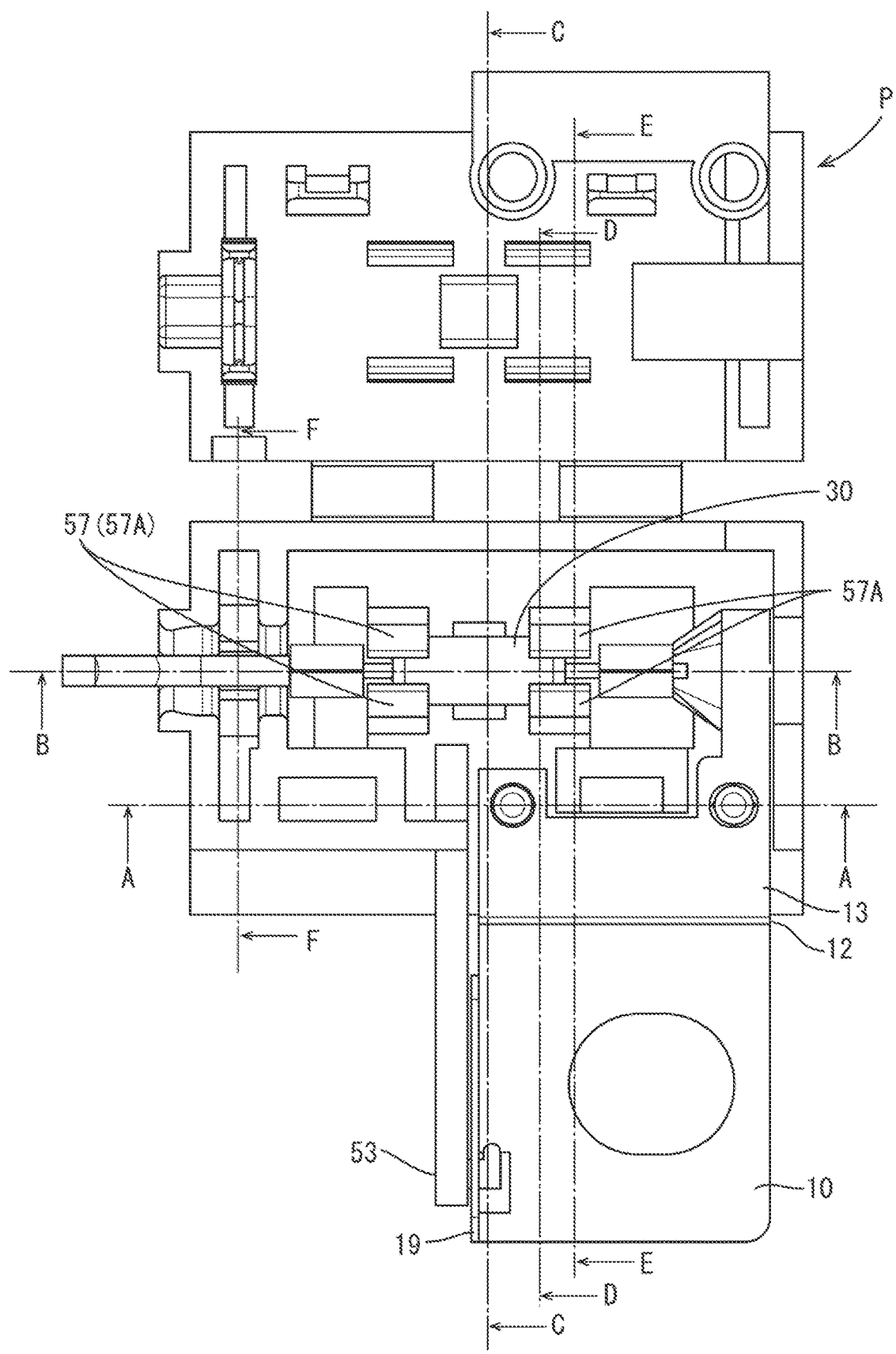
FIG. 9 is a top view illustrating a state before closing the cover of the wiring module.
Figure 10:
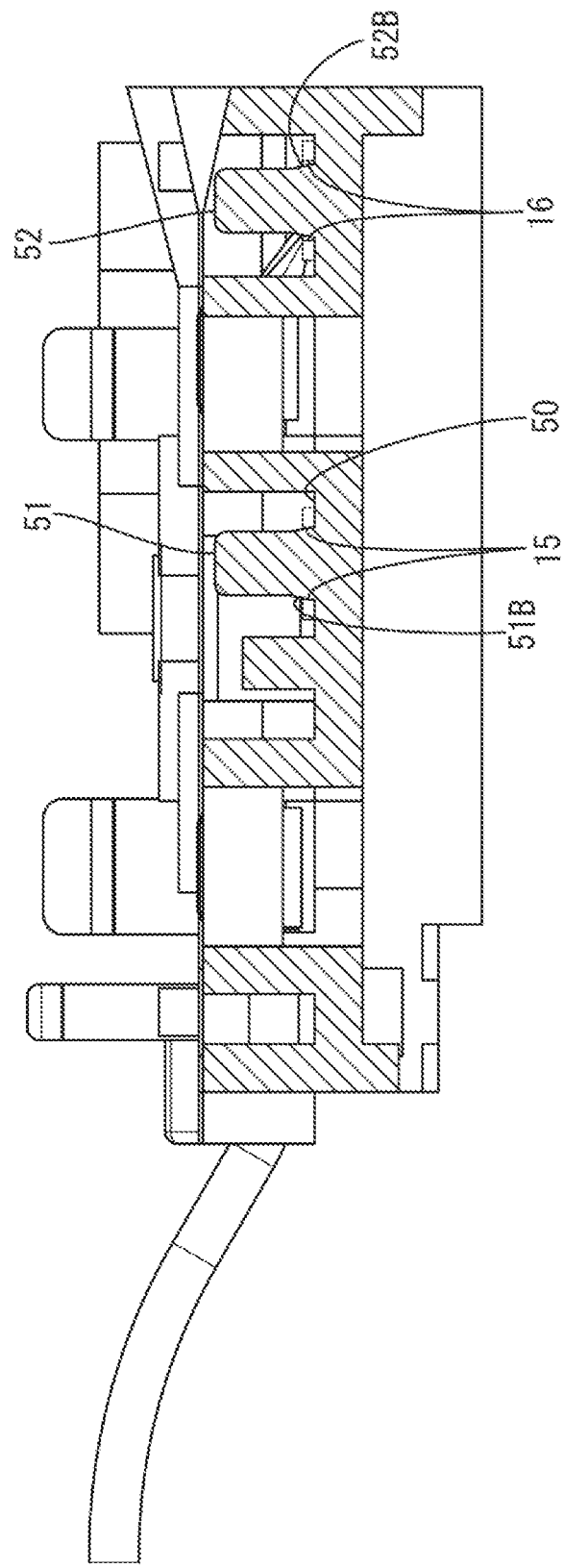
FIG. 10 is a cross-sectional view taken along A-A of FIG. 9.
Figure 11:
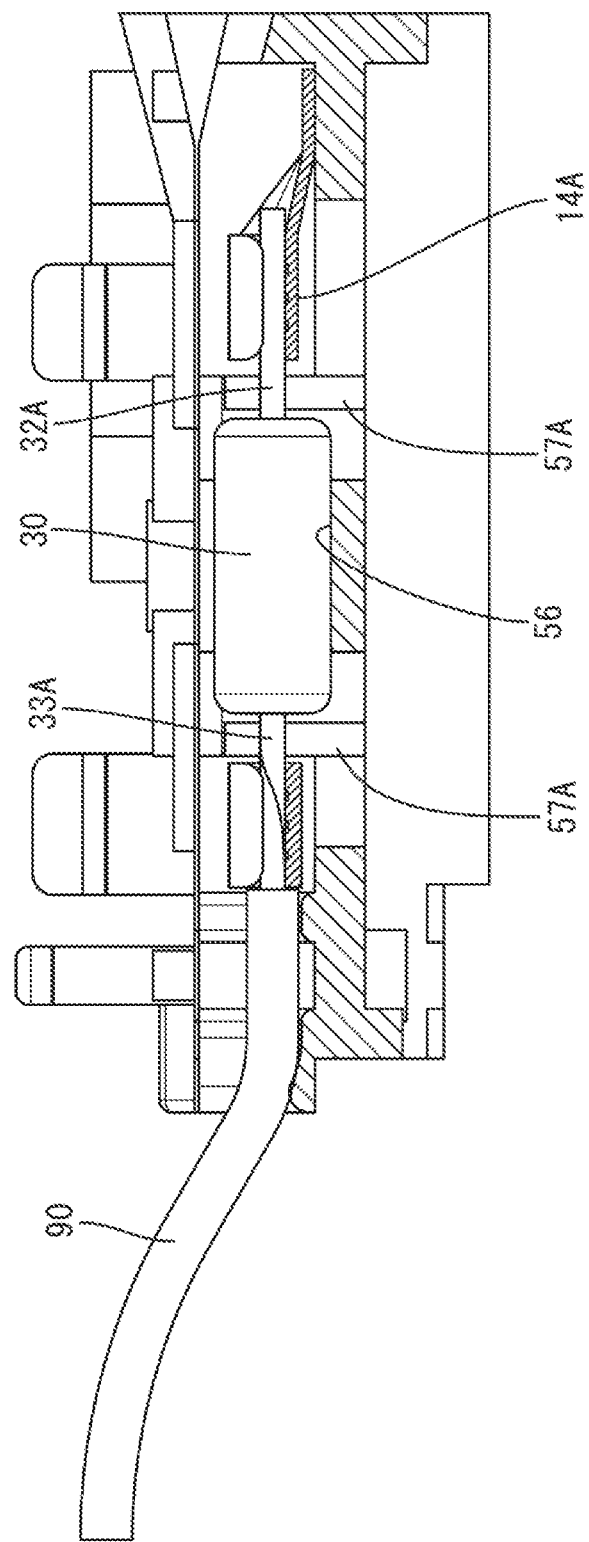
FIG. 11 is a cross-sectional view taken along B-B of FIG. 9.
Figure 12:
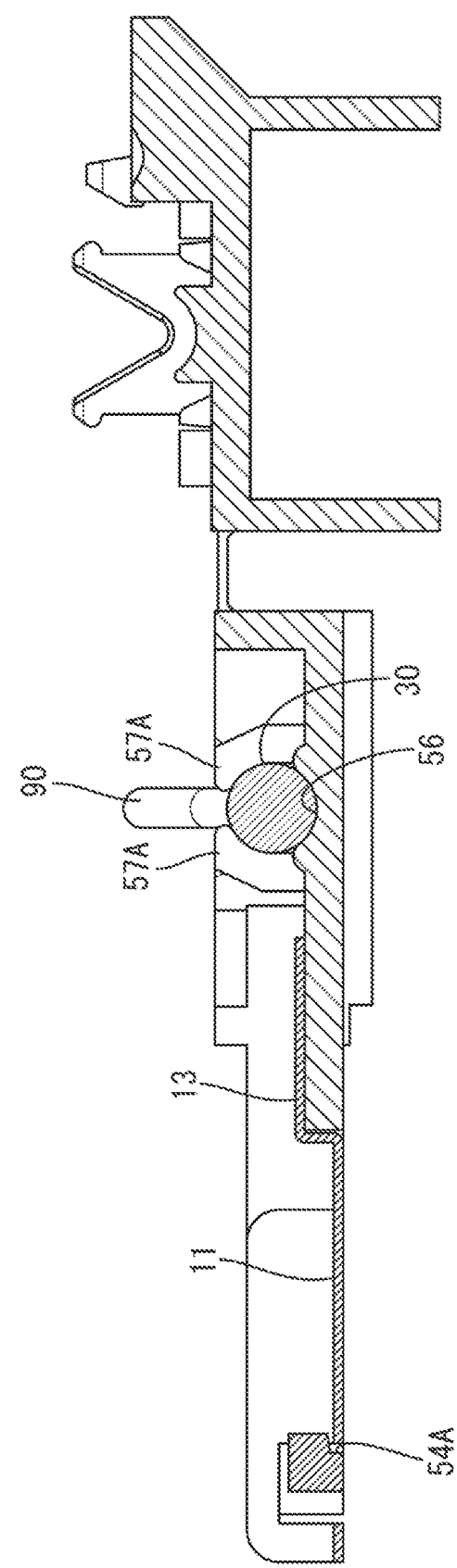
FIG. 12 is a cross-sectional view taken along C-C of FIG. 9.

In this case, as illustrated in FIG. 10, the holding hole portions 15 and 16 are closely fitted at any of height positions on the tapered portions 51B and 52B of the holding shaft portions 51 and 52 of the insulating protector P, respectively. Note that FIG. 10 illustrates a state in which the holding hole portions 15 and 16 are closely fitted onto lowermost portions of the tapered portions 51B and 52B, respectively (that is, a lower surface of the bus bar 10 abuts the plate surface of the pedestal portion 50). Further, as illustrated in FIG. 9, the abutting wall portion 19 of the bus bar 10 and the extension wall portion 53 of the insulating protector P face each other with a slight clearance caused by accumulated errors in dimension or closely abut (in close contact with) each other in a case where there is no clearance. Further, a right edge portion of the upper step portion 13 of the bus bar 10 and the right wall portion 60 of the insulating protector P face each other with a slight clearance caused by accumulated errors in dimension or closely abut each other in a case where there is no clearance. Further, a back surface of the step portion 12 of the bus bar 10 and a front edge portion of the insulating protector P face each other with a slight clearance caused by accumulated errors in dimension or closely abut each other in a case where there is no clearance.

Figure 13:
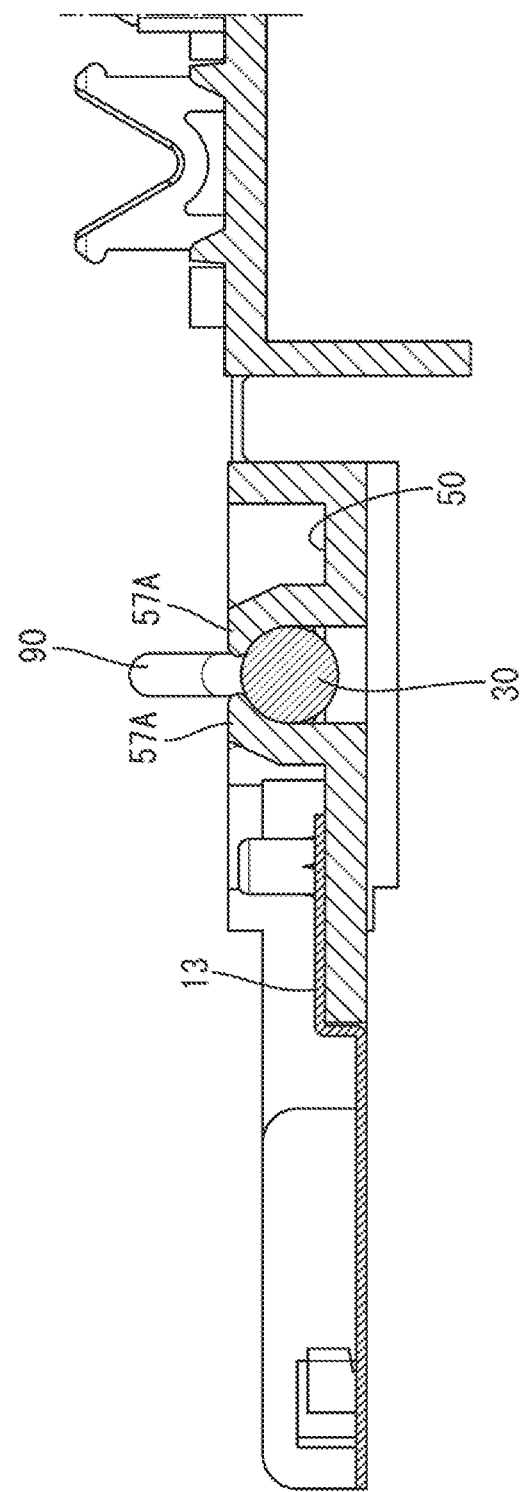
FIG. 13 is a cross-sectional view taken along D-D of FIG. 9.
Figure 14:
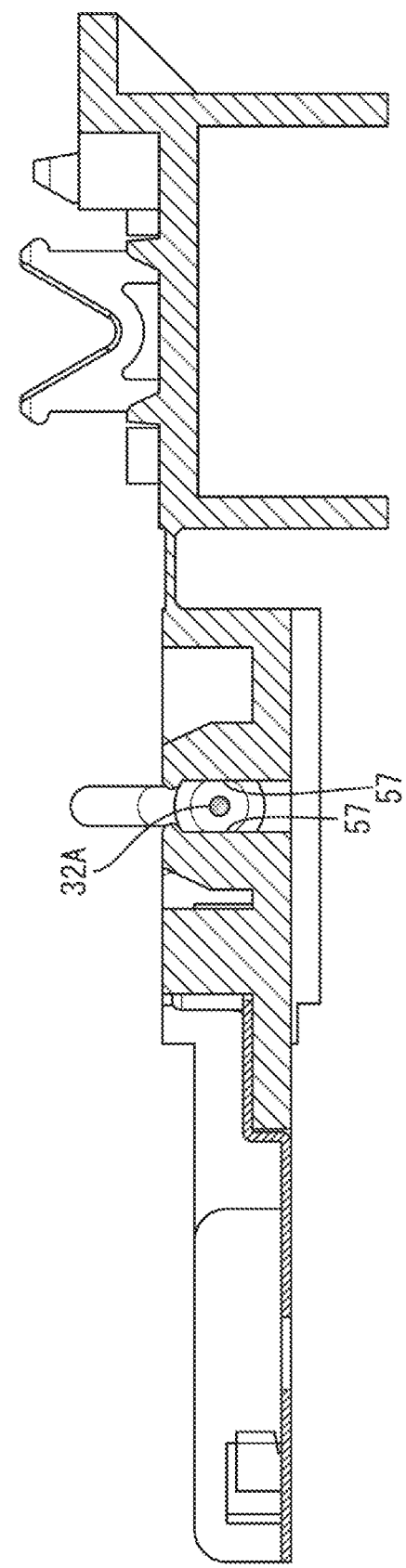
FIG. 14 is a cross-sectional view taken along E-E of FIG. 9.

Next, the fuse 30 is put between the fuse clipping portions 57 provided in the insulating protector P from above. Then, the two clipping claw portions 57A receive the fuse 30 while being elastically deformed in a direction in which the clipping claw portions 57A become distant from each other, and when the fuse 30 is placed on the fuse placing portion 56 (FIGS. 11 and 12), the clipping claw portions 57A are elastically restored to clip a circumferential surface of the fuse 30 from the front and rear sides of the fuse 30 (FIG. 13). In this case, left and right end surfaces of the fuse 30 face inner surfaces of the protruding portions 57B of the fuse clipping portions 57, respectively, and both terminals 32A and 33A of the fuse 30 are held between the protruding portions 57B (FIG. 14).

Figure 15:
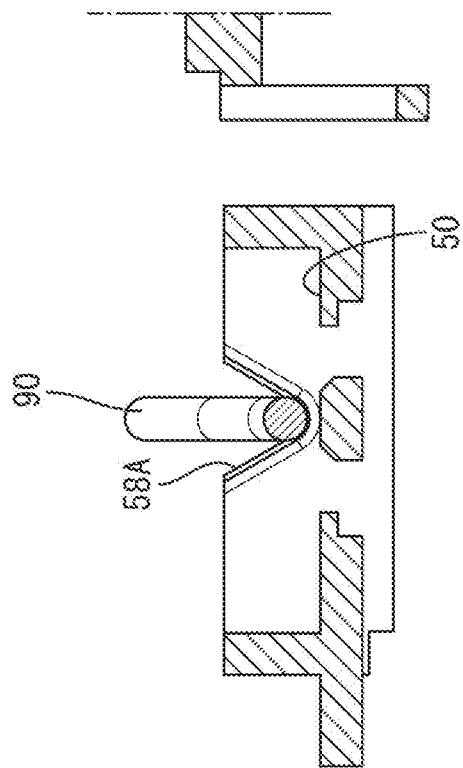
FIG. 15 is a cross-sectional view taken along F-F of FIG. 9.
Figure 16:
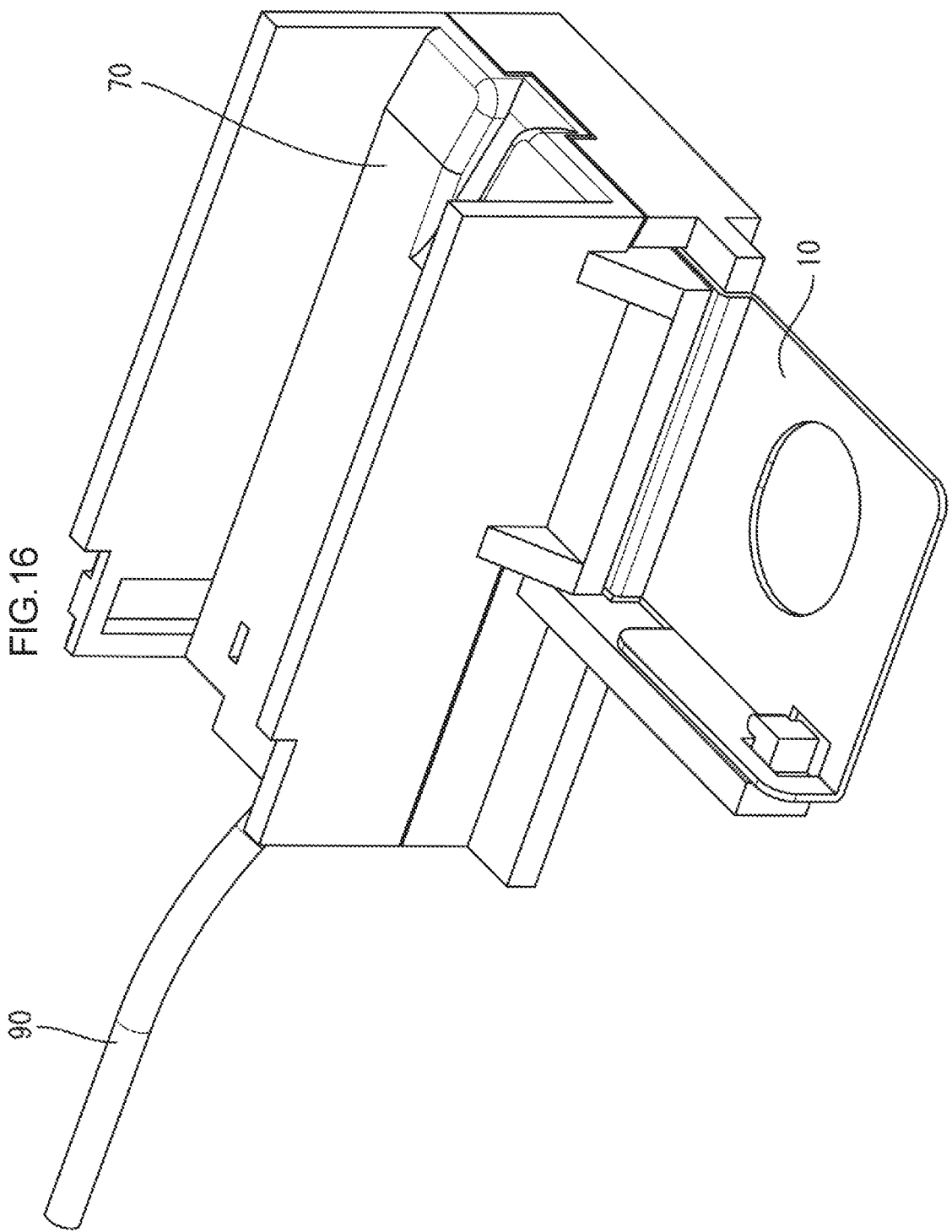
FIG. 16 is a perspective view illustrating a state after closing the cover of the wiring module.
Figure 17:
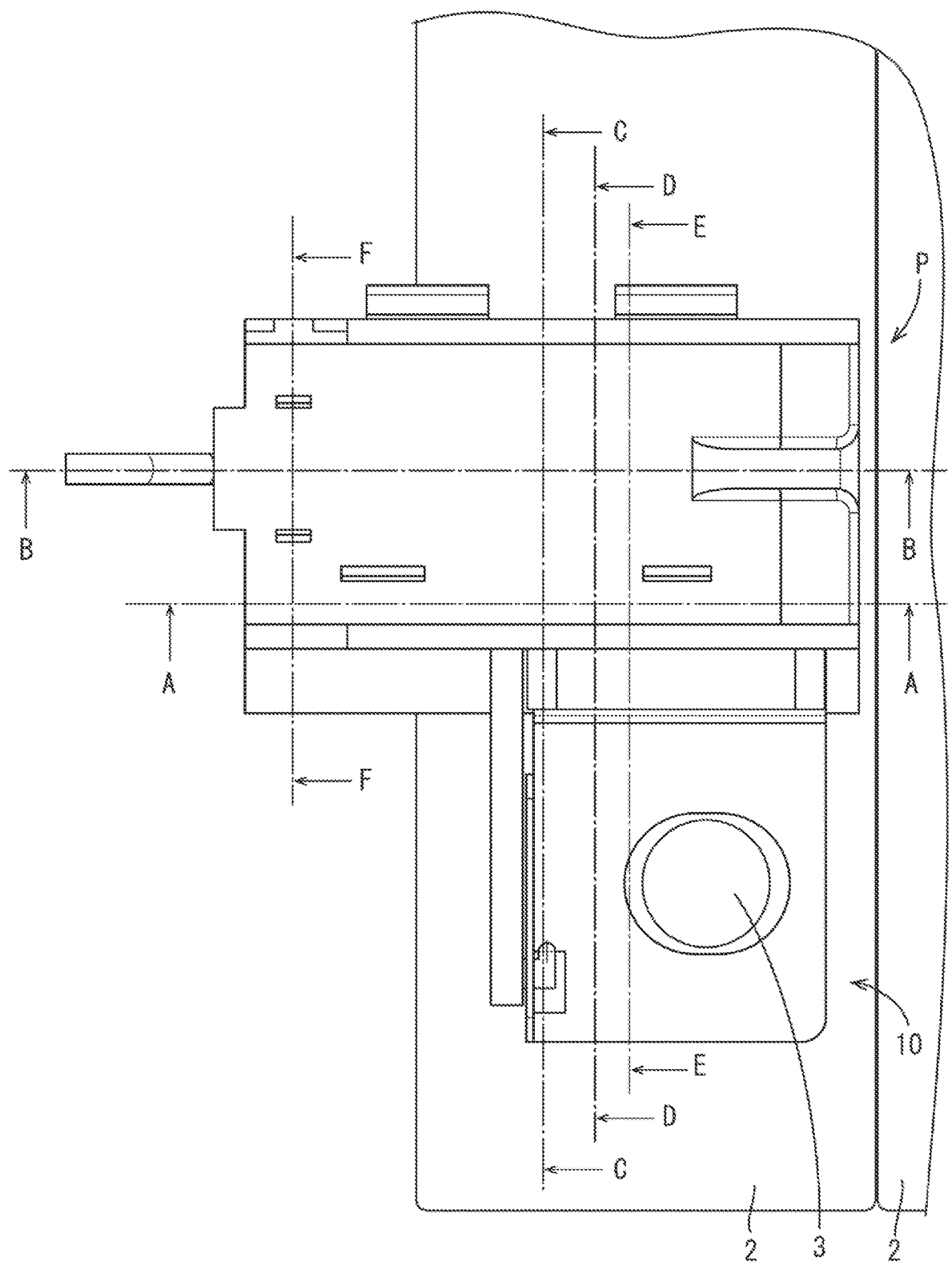
FIG. 17 is a top view illustrating a state after closing the cover of the wiring module.
Figure 23:
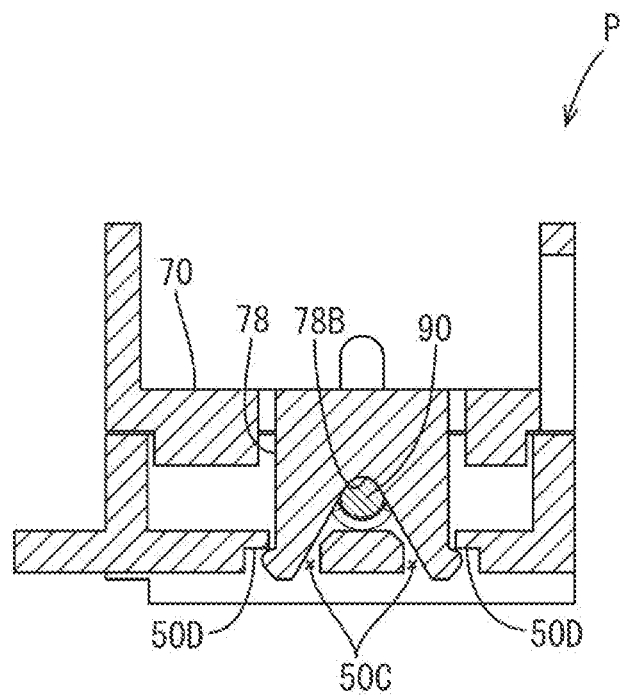
FIG. 23 is a cross-sectional view taken along F-F of FIG. 17.

Then, as illustrated in FIG. 15, the wire is placed on the conduction grooves 58A and 59A provided in the insulating protector P and then the cover portion 70 is put, such that the locking portions 79 are inserted into and locked to the locking receiving portions 63, respectively, and at the same time, the wire locking portions 78C are inserted into the wire locking holes 50C to be locked to the wire locking receiving portions 50D (FIGS. 16, 17, and 23).

Figure 18:
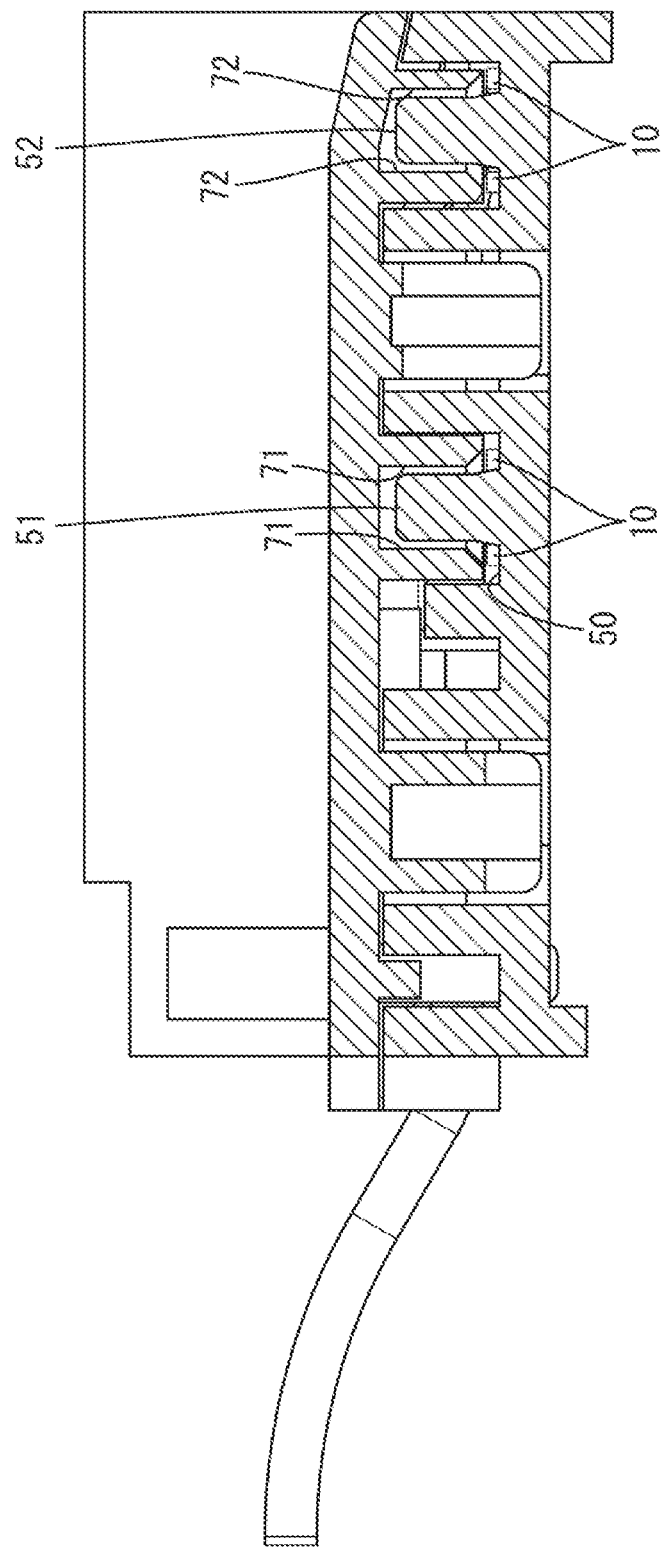
FIG. 18 is a cross-sectional view taken along A-A of FIG. 17.

In this case, as illustrated in FIG. 18, the first bus bar pressing portion 71 and the second bus bar pressing portion 72 cover the first holding shaft portion 51 and the second holding shaft portion 52, respectively, and the bus bar 10 is pressed between the upper edge portions of the bus bar pressing portions 71 and 72, and the pedestal portion 50.

Figure 20:
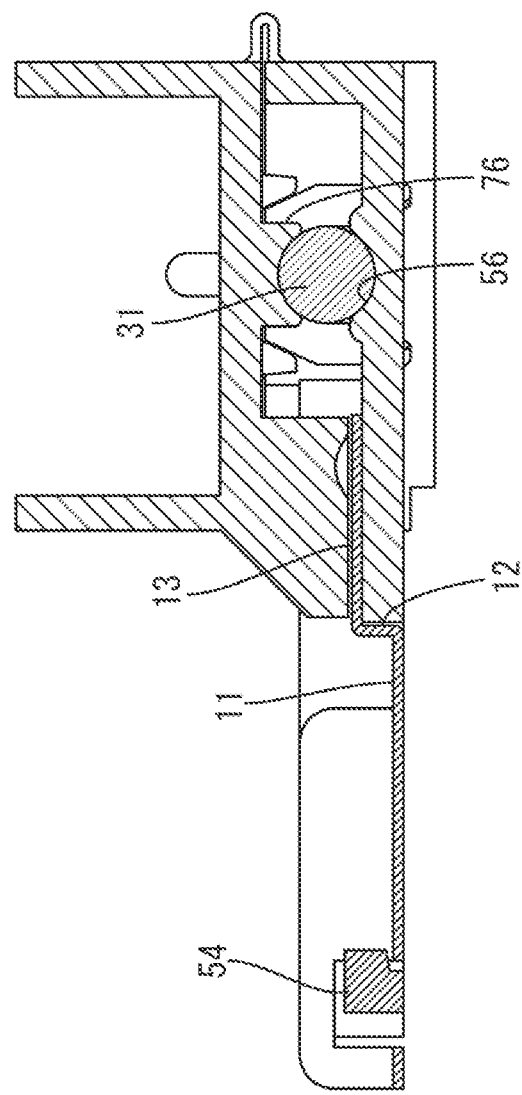
FIG. 20 is a cross-sectional view taken along C-C of FIG. 17.
Figure 21:
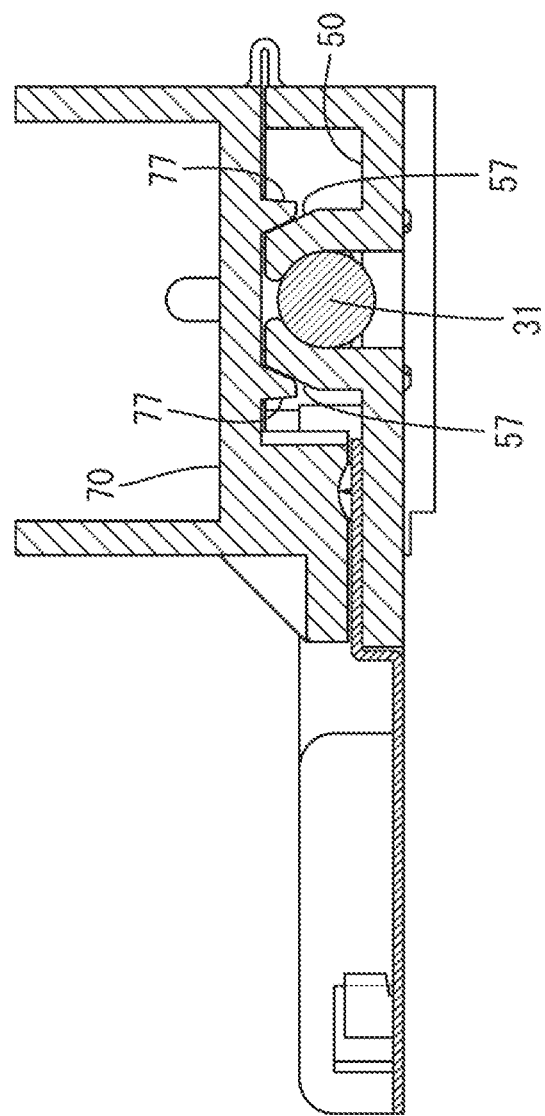
FIG. 21 is a cross-sectional view taken along D-D of FIG. 17.
Figure 22:
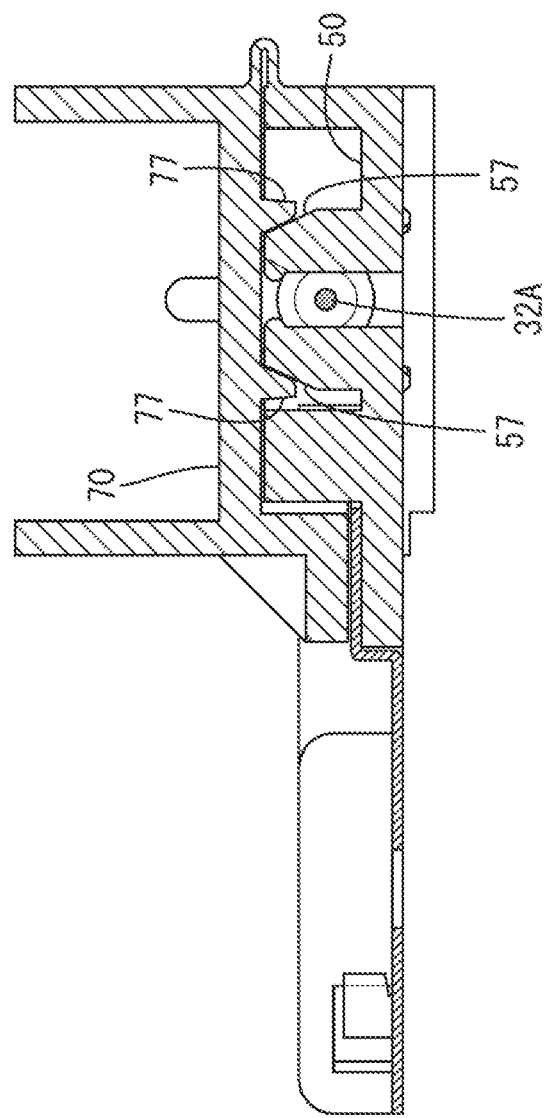
FIG. 22 is a cross-sectional view taken along E-E of FIG. 17.

Further, the fuse pressing portion 76 abuts the fuse main body portion 31 from above and the fuse placing portion 56 supports the fuse main body portion 31 from below as illustrated in FIG. 20, and a pair of front and rear opening preventing portions 77 pinches a pair of fuse clipping portions 57 from the front side and the rear side of the pair of opening preventing portions 77 as illustrated in FIGS. 21 and 22.

Figure 19:
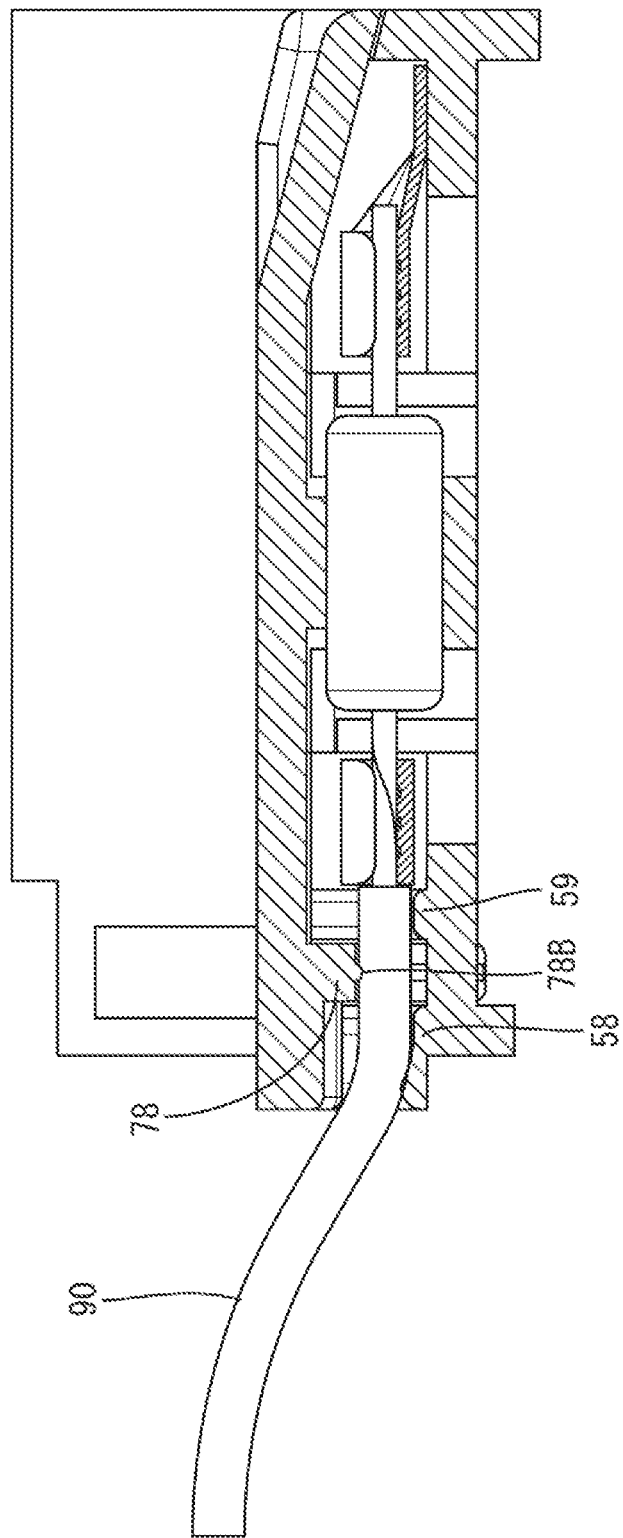
FIG. 19 is a cross-sectional view taken along B-B of FIG. 17.

As illustrated in FIGS. 19 and 23, the fitting wall portion 78 of the cover is fitted between the left wall portion 58 and the middle wall portion 59 of the pedestal portion 50, and the wire pressing portion 78B presses the detection wire 90 while making a dent in a sheath portion of the detection wire 90. As a result, the bus bar 10, the fuse 30, and the detection wire 90 are closely fixed in the insulating protector P.

According to the configuration as described above, since the first holding hole portion 15 of the bus bar 10 is closely fitted onto the tapered portion 51B of the first holding shaft portion 51 of the insulating protector P in a front-rear direction and a right-left direction of an inner diameter of the first holding hole portion 15, displacement of the bus bar 10 in a direction other than a circumferential direction of the first holding shaft portion 51 as the center is restricted. In addition, since the second holding hole portion 16 of the bus bar 10 has an elliptical shape in the right-left direction, positioning of the second holding hole portion 16 with respect to the second holding shaft portion 52 of the insulating protector P becomes easy regardless of an amount of accumulated errors in dimension, and since the second holding hole portion 16 of the bus bar 10 is closely fitted onto the tapered portion 52B of the second holding shaft portion 52, displacement of the bus bar 10 in the circumferential direction of the first holding shaft portion 51 as the center is restricted. As a result, the displacement of the bus bar 10 in all directions is restricted, such that it is possible to securely fix the bus bar 10 to the insulating protector P.

Further, since the left and right edge portions of the bus bar 10 and three surfaces of the step portion 12 face the wall portion of the insulating protector P or a thickness surface of the plate surface, a possibility that a clearance disappears due to accumulated errors in any dimension, such that the bus bar 10 closely abuts the insulating protector P increases, and it is possible to more securely fix the bus bar 10 to the insulating protector P.

In addition, the fuse 30 is pressed by the fuse clipping portions 57, the fuse placing portion 56, and the fuse pressing portion 76, and the fuse clipping portions 57 are pinched by the opening preventing portion 77 such that opening thereof is prevented, thereby making it possible to securely fix the fuse 30 to the insulating protector P.

Further, the detection wire 90 is pinched between the left wall portion 58, the fitting wall portion 78, and the middle wall portion 59, thereby making it possible to securely fix the insulating protector P.

As described above, in the wiring module 1 of the present embodiment, the bus bar 10, the fuse 30, and the detection wire 90 are securely fixed to the insulating protector P, and thus it is possible to isolate respective connected places where the fuse 30, the bus bar 10, and the detection wire 90 are connected to one another from a rotational force applied to the bus bar 10 when inserting the electrode 3 of the power element 2 into the electrode insertion hole 17 and fastening the electrode 3 with a nut, vibration at the time of use, and an external force such as a tensile force applied to the wire, thereby making it possible to retain a proper connection in the respective connected places.

Note that in the present embodiment, the connection checking openings 64 are provided in the insulating protector P at portions corresponding to the respective connected places where the fuse 30, the bus bar 10, and the detection wire 90 are connected to one another, and thus it is possible to check a connection state in a state in which the cover is put.

Other Embodiments

The present invention is not limited to the embodiment described with reference to the drawings, and can be implemented, for example, in the following modes.

Figure 24:
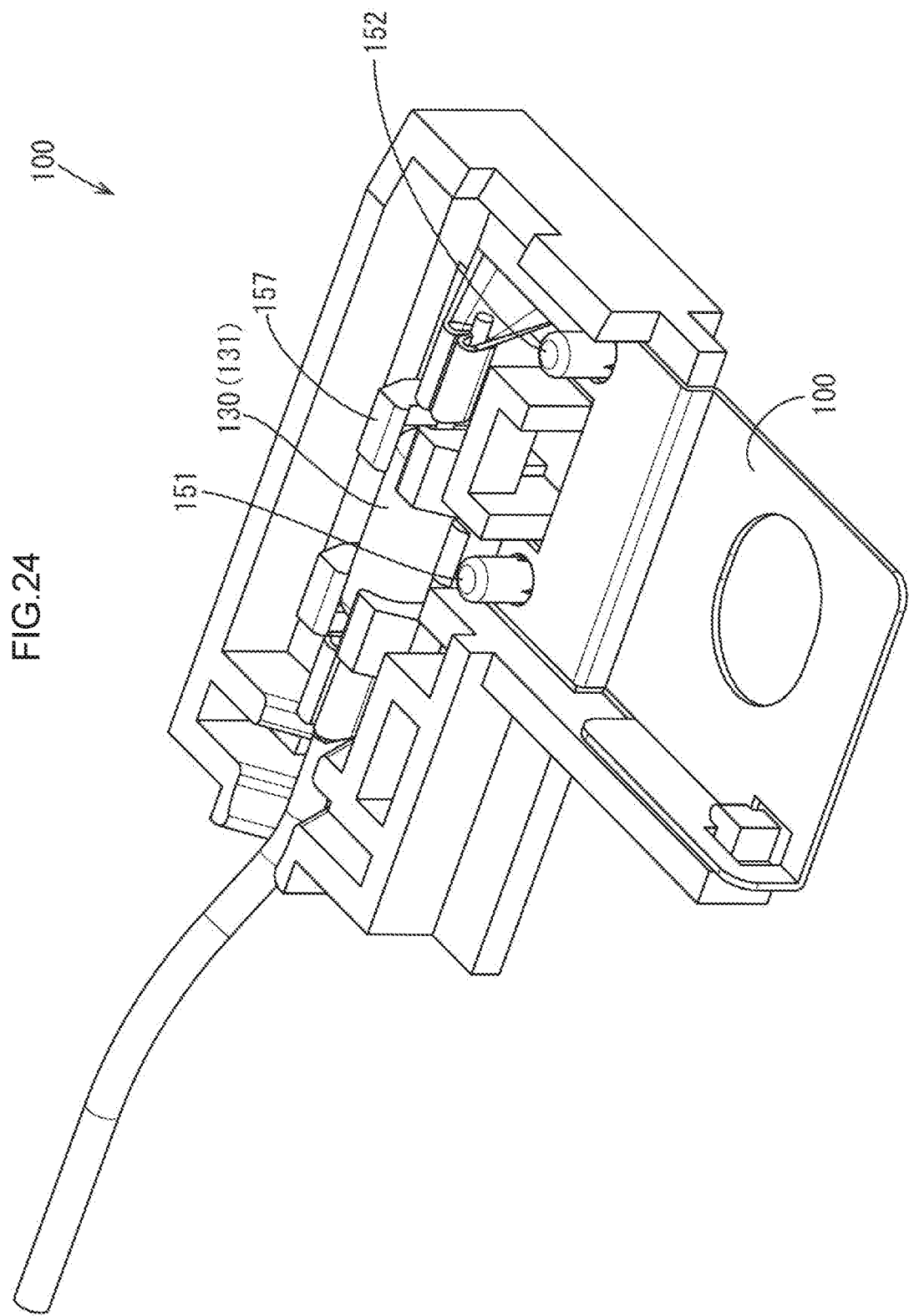
FIG. 24 is a perspective view of a wiring module according to a modified example.

(1) The insulating protector P includes the cover portion 70 in the above embodiment, but the cover portion 70 is not necessarily required. For example, in a case where there is little possibility that the detection wire 90 is strained such that an external force is applied to the connected place between the detection wire 90 and the fuse 30, or in a case where an elastic deformation force of the fuse clipping portion 57 is weak and a sufficient force to clip the fuse 30 can be maintained without the opening preventing portion 77, a wiring module 100 which does not have the cover portion 70 as illustrated in FIG. 24 may be provided. By doing so, miniaturization of the wiring module can be achieved.

(2) In the above embodiment, the bus bar 10 includes the first holding hole portion 15 and the second holding hole portion 16, and the insulating protector P includes the first holding shaft portion 51 and the second holding shaft portion 52. However, the second holding hole portion 16 and the second holding shaft portion 52 are not necessarily required. For example, a tolerance may be set such that a clearance or the like between the left edge portion of the bus bar 10 and the extension wall portion 53 of the insulating protector P becomes small instead. The point is that the bus bar 10 should be able to be fixed to the insulating protector P.

(3) In the above embodiment, the insulating protector P includes the opening preventing portions 77 for the fuse clipping portion 57, but the opening preventing portions 77 are not necessarily required. For example, in a case where an elastic deformation force of the fuse clipping portion 57 is weak and a sufficient clipping force with respect to the fuse 30 can be maintained, the opening preventing portions 77 can be omitted.

EXPLANATION OF SYMBOLS

1: Wiring module
2: Power element
10: Bus bar
16: Second holding hole portion
17: Electrode insertion hole
18: Mooring hole portion
30: Fuse
P: Insulating protector
50: Pedestal portion
51: First holding shaft portion
52: Second holding shaft portion
55: Element holding portion
56: Fuse placing portion
57: Fuse clipping portion
58A: First conduction groove
59A: Second conduction groove
70: Cover portion
71: First bus bar pressing portion
72: Second bus bar pressing portion
71A, 72A: Tapered circumferential surface portion
76: Fuse pressing portion
77: Opening preventing portion
78: Fitting wall portion
90: Detection wire

The invention claimed is:

1. A wiring module to be attached to a plurality of power elements which store or generate power, the wiring module comprising:
a connection conductor connecting the power elements to each other or connecting a power element among the power elements and a load to each other, the connection conductor having a barrel portion;
an abnormality detection element detecting an abnormality of the power element; and
an insulating protector holding the connection conductor and the abnormality detection element,
wherein the insulating protector is integrally provided with a conductor holding portion which positions and holds the connection conductor by fitting the connection conductor thereonto, and an element holding portion which positions and holds the abnormality detection element by fitting the abnormality detection element thereinto,
wherein:
the abnormality detection element is a fuse including a terminal portion,
the barrel portion of the connection conductor is crimped to the terminal portion,
the conductor holding portion includes a tapered portion protruding from the insulating protector and press-fitted into a fitting hole formed in the connection conductor, and the element holding portion includes a pair of element holding claw portions between which the abnormality detection element is press-fitted and held, and
the conductor holding portion includes a first conductor holding portion and a second conductor holding portion, the fitting hole includes a circular first holding hole portion and a second holding hole portion, and the connection conductor includes the circular first holding hole portion fitted onto the tapered portion of the first conductor holding portion, and the second holding hole portion having an elongated shape in a radial direction around the first holding hole portion and fitted onto the tapered portion of the second conductor holding portion.

2. The wiring module according to claim 1, wherein
the insulating protector is provided with a pedestal portion on which the conductor holding portion and the element holding portion are provided, and a cover portion covering the conductor holding portion and the element holding portion, and
the cover portion is provided with a conductor pressing portion holding the connection conductor between the conductor pressing portion and the pedestal portion, and an auxiliary element holding portion holding the abnormality detection element between the auxiliary element holding portion and the pedestal portion.

3. The wiring module according to claim 2, wherein
the auxiliary element holding portion includes a pair of opening preventing portions between which the pair of element holding claw portions is pinched.

4. A wiring module to be attached to a plurality of power elements which store or generate power, the wiring module comprising:
a connection conductor connecting the power elements to each other or connecting a power element among the power elements and a load to each other, the connection conductor having a barrel portion;
an abnormality detection element detecting an abnormality of the power element; and
an insulating protector holding the connection conductor and the abnormality detection element,
wherein the insulating protector is integrally provided with a conductor holding portion which positions and holds the connection conductor by fitting the connection conductor thereonto, and an element holding portion which positions and holds the abnormality detection element by fitting the abnormality detection element thereinto,
wherein:
the abnormality detection element is a fuse including a terminal portion,
the barrel portion of the connection conductor is crimped to the terminal portion,
the insulating protector is provided with a pedestal portion on which the conductor holding portion and the element holding portion are provided, and a cover portion covering the conductor holding portion and the element holding portion, and
the cover portion is provided with a conductor pressing portion holding the connection conductor between the conductor pressing portion and the pedestal portion, and an auxiliary element holding portion holding the abnormality detection element between the auxiliary element holding portion and the pedestal portion.

5. The wiring module according to claim 4, wherein
the conductor holding portion includes a tapered portion protruding from the insulating protector and press-fitted into a fitting hole formed in the connection conductor, and the element holding portion includes a pair of element holding claw portions between which the abnormality detection element is press-fitted and held, and the auxiliary element holding portion includes a pair of opening preventing portions between which the pair of element holding claw portions is pinched.

6. A wiring module to be attached to a plurality of power elements which store or generate power, the wiring module comprising:

a connection conductor connecting the power elements to each other or connecting a power element among the power elements and a load to each other, the connection conductor having a barrel portion;

an abnormality detection element detecting an abnormality of the power element; and an insulating protector holding the connection conductor and the abnormality detection element, wherein the insulating protector is integrally provided with a conductor holding portion which positions and holds the connection conductor by fitting the connection conductor thereonto, and an element holding portion which positions and holds the abnormality detection element by fitting the abnormality detection element thereinto, wherein:

the abnormality detection element is a fuse including a terminal portion, the barrel portion of the connection conductor is crimped to the terminal portion, the conductor holding portion includes a tapered portion protruding from the insulating protector and press-fitted into a fitting hole formed in the connection conductor, and the element holding portion includes a pair of element holding claw portions between which the abnormality detection element is press-fitted and held, the insulating protector is provided with a pedestal portion on which the conductor holding portion and the element holding portion are provided, and a cover portion covering the conductor holding portion and the element holding portion, and the cover portion is provided with a conductor pressing portion holding the connection conductor between the conductor pressing portion and the pedestal portion, and an auxiliary element holding portion holding the abnormality detection element between the auxiliary element holding portion and the pedestal portion.

7. The wiring module according to claim 6, wherein the auxiliary element holding portion includes a pair of opening preventing portions between which the pair of element holding claw portions is pinched.

\* \* \* \* \*